(12) United States Patent
Takizawa et al.

(10) Patent No.: US 6,342,095 B1
(45) Date of Patent: *Jan. 29, 2002

(54) INK SET, AND RECORDING METHOD AND RECORDING INSTRUMENT USING THE SAME

(75) Inventors: Yoshihisa Takizawa, Machida; Hisashi Teraoka, Kawasaki; Koichi Osumi; Yoichi Takada, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,388

(22) Filed: May 22, 1998

(30) Foreign Application Priority Data

May 22, 1997 (JP) ............................................ 9-147081

(51) Int. Cl.[7] .............................................. C09D 11/02
(52) U.S. Cl. ................................ 106/31.27; 106/31.28; 106/31.6
(58) Field of Search ........................... 106/31.27, 31.28, 106/31.6

(56) References Cited

U.S. PATENT DOCUMENTS

| | | | |
|---|---|---|---|
| 5,053,495 A | 10/1991 | Greenwood et al. | 534/829 |
| 5,198,023 A | 3/1993 | Stoffel | 106/31.27 |
| 5,518,534 A * | 5/1996 | Pearlstine et al. | 106/31.6 |
| 5,713,993 A * | 2/1998 | Grezzo Page et al. | 106/31.85 |
| 5,730,790 A * | 3/1998 | Rehman | 106/31.28 |
| 5,750,594 A * | 5/1998 | Page et al. | 106/31.76 |
| 5,853,465 A * | 12/1998 | Tsang et al. | 106/31.27 |
| 5,911,815 A * | 6/1999 | Yamamoto et al. | 106/31.27 |
| 5,958,121 A * | 9/1999 | Lin | 106/41.43 |
| 5,976,231 A * | 11/1999 | Schwarz | 106/31.43 |
| 5,985,015 A * | 11/1999 | Kanaya | 106/31.6 |
| 6,022,908 A * | 2/2000 | Ma et al. | 106/31.28 |
| 6,036,759 A * | 3/2000 | Wickramanayake et al. | 106/31.28 |

FOREIGN PATENT DOCUMENTS

| | | | |
|---|---|---|---|
| EP | 0588241 | * | 3/1994 |
| EP | 0 633 142 A1 | | 1/1995 |
| EP | 0 675 178 A2 | | 10/1995 |
| EP | 0 692 527 A2 | | 1/1996 |
| EP | 0801118 | * | 10/1997 |
| EP | 0952195 | * | 10/1999 |
| EP | 0953616 | * | 11/1999 |
| JP | 4-226175 | | 8/1992 |
| JP | 5-179183 | | 7/1993 |
| JP | 6-57192 | | 3/1994 |
| JP | 6-136311 | | 5/1994 |
| JP | 7-53841 | | 2/1995 |
| JP | 7-314888 | | 12/1995 |
| JP | 8-193176 | | 7/1996 |
| JP | 9-118850 | | 5/1997 |

* cited by examiner

Primary Examiner—Helene Klemanski
(74) Attorney, Agent, or Firm—Fitzpatrick, Cella, Harper & Scinto

(57) ABSTRACT

Disclosed herein is an ink set comprising two black inks the coloring materials for which are both pigments, wherein one black ink is cationic, and the other black ink is anionic.

97 Claims, 5 Drawing Sheets

DOT RECORDED WITH BLACK INK A

DOT RECORDED WITH BLACK INK B

DOT RECORDED WITH BLACK INK A

DOT RECORDED WITH BLACK INK B

INK SET, AND RECORDING METHOD AND RECORDING INSTRUMENT USING THE SAME

BACKGROUND OF THE INVENTION

1. Field of the Invention

The present invention relates to ink sets for ink-jet recording, which are used in recording black images on a recording medium by using in combination plural inks different in polarity as black inks, and an ink-jet recording method and ink-jet recording instruments using such an ink set, and more particularly to ink sets for ink-jet recording, which permit the provision of clear and high-quality images having a sufficient optical density and of prints having excellent water fastness and light fastness, irrespective of the kind of plain paper, and an ink-jet recording method and ink-jet recording instruments using such an ink set.

The present invention also relates to ink sets for ink-jet recording in which a color image is printed with at least two inks of different colors by ejecting ink droplets on a recording medium, and an ink-jet recording method and ink-jet recording instruments using such an ink set, and more particularly to ink sets, which can prevent bleeding at boundaries between a black ink and color inks (hereinafter referred to "bleeding" simply) and white uneven image disorder (hereinafter referred to "white haze") occurred in a black image region at a boundary area between a black ink and a color ink even when plain paper is used, and hence permits the provision of clear color images, and an ink-jet recording method and ink-jet recording instruments using such an ink set.

2. Related Background Art

With the spread of ink-jet recording systems, it is advanced to improve the quality and fastness properties of prints. With respect to, for example, water fastness, Japanese Patent Application Laid-Open No. 4-226175 and U.S. Pat. No. 5,053,495 disclose novel black dyes and inks which can provide images having good water fastness.

Black inks using a pigment have been reported to form black images excellent in print quality and fastness properties such as water fastness and light fastness on plain paper.

For example, Japanese Patent Application Laid-Open No. 5-179183 discloses pigment inks stabilized with a block polymer of an AB or BAB type, in which A is a hydrophobic homopolymer or copolymer of an acrylic monomer, and B is a hydrophilic polymer or a salt thereof. Japanese Patent Application Laid-Open No. 6-136311 discloses pigment inks which comprise a block polymer of a hydrophobic polymer having a basic amine functional group and a hydrophilic polymer having a nonionic acidic functional group, can provide prints of excellent quality and have excellent dispersion stability. Japanese Patent Application Laid-Open No. 7-53841 has proposed pigment inks for ink-jet, which comprise a triblock polymer of an ABC type, in which A is a hydrophilic homopolymer, B is a polymer bonded to solid particles, and C is a hydrophilic or hydrophobic polymer different from the block A, have excellent dispersion stability and can provide prints of excellent quality.

On the other hand, with the spread of ink-jet recording systems, it is attempted to improve the quality of color images formed on plain paper.

In order to improve the quality of color images, in particular, it is required that black characters recorded on plain paper have such good quality as they are high in density, sharp and free of any feathering. It has also been reported to reduce bleeding phenomenon caused by contact of plural recording inks of different colors with each other at boundary parts of different colors and white haze occurred in a black image region at a boundary area between a color ink and a black ink. White haze means a phenomenon that an image is disordered white unevenly.

For example, Japanese Patent Application Laid-Open No. 8-193176 discloses inks comprising a penetrating agent and 0.02 to 0.5% by weight of an alginate. Japanese Patent Application Laid-Open No. 6-57192 has proposed black inks containing an anionic dye and yellow inks containing a cationic dye and a polyvalent precipitant. Japanese Patent Application Laid-Open No. 9-118850 has proposed inks in which a first ink is composed of a pigment dispersion, and a second ink comprises an organic acid salt or mineral acid salt. Japanese Patent Application Laid-Open No. 7-314888 has proposed inks comprising a specific fluorine compound.

The methods described in Japanese Patent Application Laid-Open No. 4-226175 and U.S. Pat. No. 5,053,495 feature that one or more carboxylic acids, which are weak acids, are introduced into a dye molecule, thereby developing the water fastness of the resulting print making good use of the dependence of solubility of the dye on pH. However, the water fastness is insufficient, in particular, when using neutralized paper because the surface pH of paper plain varies with the kind of the paper.

The pigment inks disclosed in Japanese Patent Application Laid-Open Nos. 5-179183, 6-136311 and 7-53841 can provide images excellent in fastness properties such as water fastness and light fastness, and improve the print quality in plain paper to some extend. However, these inks have involved such problems as optical density becomes insufficient according to the kind of plain paper, and fixing ability becomes poor in plain paper that sufficient optical density can be attained.

On the other hand, the inks comprising a penetrating agent, 0.02 to 0.5% by weight of an alginate and a solid wetting agent described in Japanese Patent Application Laid-Open No. 8-193176 can prevent bleeding and white haze phenomenon to some extent. However, the wettability of paper is enhanced due to the penetrating agent and solid wetting agent, so that feathering occurs at edge parts of characters printed, resulting in a failure to attain satisfactory character quality.

The inks described in Japanese Patent Application Laid-Open Nos. 6-57192 and 9-118850 cause aggregation of dyes or pigments at boundaries between different colors, so that bleeding can be prevented to some extent, and the quality of black characters is also improved to some extent. However, the aggregation occurs only at boundaries within a black region, so that white haze phenomenon that occurs in the black region cannot be prevented. On the other hand, Japanese Patent Application Laid-Open No. 7-314888 discloses the inks comprising the specific fluorine compound, in which the surface energy of a first ink is adjusted within 15 dyn/cm of the surface energy of a second ink. White haze phenomenon is reduced to some extent by this method. However, it has been insufficient to prevent the white haze phenomenon in the case of high speed recording in which different colors overlap one after other in a short period of time, or according to the kind of plain paper.

SUMMARY OF THE INVENTION

It is therefore the first object of the present invention to provide an ink set for ink-jet, which can attain high optical density for images of black ink and has good fixing ability, irrespective of the kind of plain paper, and a recording method and recording instruments using such an ink set.

The second object of the present invention is to provide an ink set for ink-jet, which can attain high optical density for images of black ink, has good fixing ability and can provide prints excellent in fastness properties such as water fastness and light fastness, irrespective of the kind of plain paper, and a recording method and recording instruments using such an ink set.

The third object of the present invention is to provide an ink set which can provide black characters of high quality, prevent both bleeding and white haze and provide clear color images, irrespective of the kind of plain paper, and a recording method and recording instruments using such an ink set.

The above objects can be achieved by the present invention described below.

According to the first aspect of the present invention, there is provided an ink set comprising two black inks different in polarity from each other as black inks.

The ink set according to the first aspect of the present invention includes the following three embodiments.

(1) An ink set comprising two black inks different in polarity from each other, wherein one of said two black inks is a pigment ink, and the other is also a pigment ink.

(2) An ink set comprising two black inks different in polarity from each other, wherein one of said two black inks is a pigment ink, and the other is a dye ink.

(3) An ink set comprising two black inks different in polarity according to the embodiment (1) or (2), and additional color inks.

The ink set according to the embodiment (1) will be first described.

The ink set according to the embodiment (1) comprises two black inks different in polarity from each other, wherein one of said two black inks is a pigment ink, and the other is also a pigment ink.

The ink set may comprise two black inks the coloring materials for which are different in polarity from each other, wherein one of said two black inks is a pigment ink, and the other is also a pigment ink.

More specifically, the ink set may comprise two black inks the coloring materials for which are both pigments, wherein one black ink is cationic, and the other black ink is anionic.

The cationic ink may preferably be a pigment ink in which a pigment is dispersed with a cationic polymer or surfactant, or a self-dispersing type pigment ink in which a hydrophilic group is bonded to the surface of a pigment through an atomic group having a cationic group.

The anionic ink may preferably be a pigment ink in which a pigment is dispersed with an anionic polymer or surfactant, or a self-dispersing type pigment ink in which a hydrophilic group is bonded to the surface of a pigment through an atomic group having an anionic group.

The ink set may preferably comprise two black inks the coloring materials for which are both pigments, wherein one black ink is a self-dispersing type cationic pigment ink in which a hydrophilic group having a cationic group is directly bonded to carbon black, and the other black ink is a self-dispersing type anionic pigment ink in which a hydrophilic group having a anionic group is directly bonded to carbon black.

The hydrophilic group in the cationic pigment ink may preferably be composed of at least one aromatic or heterocyclic group and at least one cationic group.

The cationic group may preferably be a quaternary ammonium group, and the anionic group may be a sulfonic or carboxyl group.

One black ink of the two black inks in the ink set may preferably have a surface tension of at least 40 dyn/cm, and the other black ink may have a surface tension lower than 40 dyn/cm.

The ink set according to the embodiment (2) will be then described.

The ink set according to the embodiment (2) comprises two black inks different in polarity from each other, wherein one of said two black inks is a pigment ink, and the other is a dye ink.

The ink set may comprise two black inks the coloring materials for which are different in polarity from each other, wherein one of said two black inks is a pigment ink, and the other is a dye ink.

More specifically, the ink set may comprise two black inks the coloring materials for which are a pigment for one ink and a dye for the other ink, wherein one black ink is cationic, and the other black ink is anionic.

The cationic ink may preferably be a pigment ink in which a pigment is dispersed with a cationic polymer or surfactant, or a self-dispersing type pigment ink in which a hydrophilic group is bonded to the surface of a pigment through an atomic group having a cationic group.

The cationic ink may preferably be a cationic dye ink.

The anionic ink may preferably be a pigment ink in which a pigment is dispersed with an anionic polymer or surfactant, or a self-dispersing type pigment ink in which a hydrophilic group is bonded to the surface of a pigment through an atomic group having an anionic group.

The anionic ink may preferably be an anionic dye ink.

The ink set may preferably comprise two black inks the coloring materials for which are a pigment for one ink and a dye for the other ink, wherein one black ink is a self-dispersing type cationic pigment ink in which a hydrophilic group having a cationic group is directly bonded to carbon black, and the other black ink is an anionic dye ink.

The hydrophilic group in the cationic pigment ink may preferably be composed of at least one aromatic or heterocyclic group and at least one cationic group.

The cationic group may preferably be a quaternary ammonium group.

The cationic ink may preferably comprise a cationic polymer.

The anionic dye ink may preferably comprise an anionic polymer.

The ink set may preferably comprise two black inks the coloring materials for which are a pigment for one ink and a dye for the other ink, wherein one black ink is a cationic dye ink, and the other black ink is a self-dispersing type anionic pigment ink in which a hydrophilic group having an anionic group is directly bonded to carbon black.

The anionic group may preferably be a sulfonic or carboxylic group.

The anionic pigment ink may preferably comprise an anionic polymer.

The cationic dye ink may preferably comprise a cationic polymer.

One black ink of the two black inks in the ink set may preferably have a surface tension of at least 40 dyn/cm, and the other black ink may have a surface tension lower than 40 dyn/cm.

The ink set according to the embodiment (3) will be described.

The ink set according to the embodiment (3) comprises two black inks different in polarity from each other as black inks and additional color inks.

One of said two black inks different in polarity from each other may preferably be a pigment ink, and the other may also be a pigment ink. One of said two black inks the coloring materials for which are different in polarity may preferably be a pigment ink, and the other may also be a pigment ink. In this case, specific embodiments in which said two black inks different in polarity each other are both pigment inks may be the same as embodiments in the ink set according to the embodiment (1).

One of said two black inks different in polarity from each other may preferably be a pigment ink, and the other may be a dye ink. One of said two black inks the coloring materials for which are different in polarity may preferably be a pigment ink, and the other may be a dye ink. In this case, specific embodiments in which one of said two black inks different in polarity is a pigment ink, and the other is a dye ink may be the same as embodiments in the ink set according to the embodiment (2).

The coloring materials used for the color inks may preferably be dyes.

The color inks may preferably be at least yellow, magenta and cyan inks.

The color inks may preferably have a surface tension lower than 40 dyn/cm.

The present invention also relates to an ink-jet recording method and instruments using any one of these ink sets.

According to the second aspect of the present invention, there is thus provided an ink-jet recording method comprising ejecting ink droplets from orifices in response to recording signals to conduct recording on a recording medium, wherein two black inks different in polarity from each other are used as black inks to conduct the recording.

There is also provided an ink-jet recording method comprising ejecting ink droplets from orifices in response to recording signals to conduct recording of a black color on a recording medium, wherein two black inks different in polarity from each other are used as black inks to conduct the black-color recording.

The black inks may preferably be the ink set according to the embodiment (1) or (2).

There is further provided an ink-jet recording method comprising ejecting ink droplets from orifices in response to recording signals to conduct recording of at least two colors on a recording medium, wherein two inks different in polarity from each other as black inks, and color inks are used to conduct the recording.

The black inks and color inks may preferably be the ink set according to the embodiment (3).

The ink droplets may preferably be ejected by applying thermal energy to the inks.

According to the third aspect of the present invention, there is provided a recording unit comprising an ink container portion with an ink held therein and a head from which the ink is ejected in the form of ink droplets, wherein the ink is one of any ink set described above.

The head may preferably be a head of the type that thermal energy is applied to an ink to eject droplets of the ink.

The ink container portion may preferably be formed of polyurethane, cellulose, polyvinyl acetate or polyolefin resin.

According to the fourth aspect of the present invention, there is provided an ink cartridge comprising an ink container portion with an ink held therein, wherein said ink is one of any ink set described above.

The ink container portion may preferably be formed with a polyolefin at its surface with which the ink comes into contact.

According to the fifth aspect of the present invention, there is provided an ink-jet recording apparatus comprising a recording unit having an ink container portion with an ink held therein and a head from which the ink is ejected in the form of ink droplets, wherein the ink is one of any ink set described above.

The head may preferably be a head of the type that thermal energy is applied to an ink to eject droplets of the ink.

The ink container portion may preferably be formed of polyurethane, cellulose, polyvinyl acetate or polyolefin resin.

According to the sixth aspect of the present invention, there is provided an ink-jet recording apparatus comprising a recording head from which an ink is ejected in the form of ink droplets, an ink cartridge having an ink container portion with the ink held therein, and an ink feeder for feeding the ink contained in the ink cartridge to the recording head, wherein the ink is one of any ink set described above.

The recording head may preferably be a head of the type that thermal energy is applied to an ink to eject droplets of the ink.

The ink container portion may preferably be formed with a polyolefin at its surface with which the ink comes into contact.

With respect to the embodiment (1), the present inventors have carried out an extensive investigation with a view toward developing black inks which can attain high optical density for black images and provide high-quality images, irrespective of the kind of plain paper. As a result, it has been found that when a set of two black inks different in a polarity each other is used as a black ink, the performance satisfying the above object can be achieved.

In the present invention, the term "polarity" means an ionicity that an ink has, and the term "different in a polarity" means that at least two inks are different in an ionicity. For example, a combination of an anionic ink and a cationic ink may be mentioned.

More specifically, two black inks of an anionic black ink and a cationic black ink are used as black inks to form an image of a black color. As a method for changing the ionicity of an ink, may be mentioned a method in which the ionicity is changed with a coloring material, additive and/or the like. It is preferable that the ionicity of the coloring material be changed. It is more preferable that a pigment be used as the coloring material.

When recording of a black color is conducted by using both anionic black ink and cationic black ink as black inks, both inks come into contact with each other on a recording medium, and so the coloring materials aggregate in themselves due to bonding between anion and cation. As a result, the coloring materials remain on the surface of the recording medium, and only liquid media penetrate into the recording medium, so that a high optical density can be attained. When pigments are used as the coloring materials, the effect is more enhanced, and the fastness properties of the resulting print are improved. Since the aggregation of the coloring materials themselves occurs independent of the sizing agent and surface pH of plain paper, good optical density and image quality can be attained, irrespective of the kind of plain paper. When the penetrability of one of the two black inks is made higher, the fixing ability is also improved.

With respect to the embodiment (2), the present inventors have carried out an extensive investigation with a view toward developing black inks which can attain high optical density for black images and provide high-quality images excellent in fastness properties such as water fastness and light fastness, irrespective of the kind of plain paper. As a result, it has been found that when an ink set comprising two black inks different in polarity from each other, wherein one of said two black inks is a pigment ink, and the other is a dye ink, is used as a black ink, the performance satisfying the above object can be achieved. More specifically, an ink set composed of two black inks the coloring materials of which are a pigment for one ink and a dye for the other ink, wherein one black ink is anionic, and the other black ink is cationic, is used to form an image of a black color. As a method for changing the ionicity of an ink, may be mentioned a method in which the ionicity is changed with a coloring material, additive and/or the like. It is preferable that the ionicity of the coloring material be changed.

When recording of a black color is conducted by using both anionic black ink and cationic black ink as black inks, both inks come into contact with each other on a recording medium, and so the coloring materials aggregate in themselves. As a result, the coloring materials remain on the surface of the recording medium, and only liquid media penetrate into the recording medium, so that a high optical density can be attained. When a pigment is used as the coloring material for one ink, and a dye is uses as the coloring material for the other ink, the effect is more enhanced, and the fastness properties of the resulting print are also improved. Since the aggregation of the coloring materials themselves occurs independent of the sizing agent and surface pH of plain paper, good optical density and image quality can be attained, irrespective of the kind of plain paper.

When the penetrability of one of the two black inks is made higher, the fixing ability is also improved.

With respect to the embodiment (3), the present inventors have carried out an extensive investigation with a view toward attaining the excellent quality of black characters, irrespective of the kind of plain paper, and preventing bleeding and white haze phenomenon between a black ink and a color ink. As a result, it has been found that when two black inks different in polarity from each other are used as black inks in an ink set for ink-jet used in conducting recording of color images, the performance satisfying the above object can be achieved.

More specifically, two black inks of an anionic black ink and a cationic black ink are used as black inks to form an image of a black color. As a method for changing the ionicity of an ink, may be mentioned a method in which the ionicity is changed with a coloring material, additive and/or the like. It is preferable that the ionicity of the coloring material be changed. It is more preferable that a pigment be used as the coloring material.

When color recording of at least two colors is conducted by using both anionic black ink and cationic black ink as black inks, the black inks come into contact with each other on a recording medium, and so the coloring materials aggregate in themselves due to bonding between anion and cation and are fixed on the surface of the recording medium. As a result, only liquid media penetrate into the recording medium, so that high-quality black characters can be provided. Since the coloring materials of the black inks are fixed in all the region at boundary areas between the black ink and the color inks, both bleeding and white haze phenomenon can be substantially perfectly prevented. Since this effect is independent of the kind (for example, sizing agent and surface pH) of plain paper, the same effect can be brought about even in any plain paper. When the surface tensions of the color inks are adjusted to lower than 40 dyn/cm, the effect is more enhanced. When the penetrability of one of the two black inks is made higher, the fixing ability is also improved.

DESCRIPTION OF THE PREFERRED EMBODIMENTS

Figure 1:
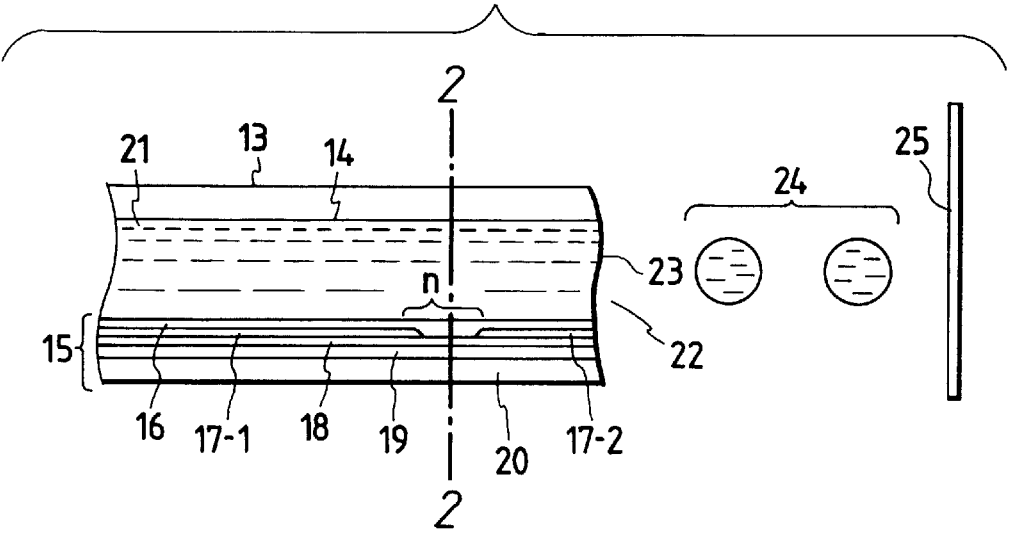
FIG. 1 is a longitudinal cross-sectional view of a head of an ink-jet recording apparatus.

The present invention will hereinafter be described in detail by the preferred embodiments of the invention.

The ink sets according to the present invention include two black inks different in polarity from each other, i.e., ionicity, as black inks. The ionicity of each ink is changed by changing the ionicity of a coloring material used for the ink.

As coloring materials, may be used any known dyes and pigments. However, it is necessary to use cationic and anionic coloring material in combination.

In the ink set according to the embodiment (1), pigments are used as the coloring materials. The most preferable ink set is an ink set comprising a cationic pigment-dispersed ink and an anionic pigment-dispersed ink.

In the ink set according to the embodiment (2), it is necessary that a dye and a pigment be respectively used as coloring materials for both black inks, and a cationic and anionic coloring materials be used in combination. The most preferable ink set is an ink set comprising a cationic pigment-dispersed ink and an anionic water-based dye ink or an ink set comprising a cationic water-based dye ink and an anionic pigment-dispersed ink.

In the ink set according to the embodiment (3), two black inks different in polarity from each other according to the embodiment (1) or (2) as black inks, and additional color inks are used. Dyes are used as coloring materials for the color inks. Any commercially available or known acid dyes, direct dyes, basic dyes, disperse dyes and the like may be suitably used. It is particularly preferable to use acid and direct dyes having an anionic group. The color inks preferably have a surface tension lower than 40 dyn/cm.

Components of each ink in the ink sets according to the present invention will hereinafter be described.

Carbon black and water-soluble black dyes are preferably used as coloring materials useful in the practice of the present invention.

A cationic dispersion of carbon black may be prepared by (1) dispersing carbon black using a dispersing agent such as a cationic surfactant or cationic polymer. However, (2) a dispersion of a self-dispersing type carbon black obtained by bonding at least one hydrophilic group directly or through another atomic group to the surface of carbon black is preferably used.

In the cationic carbon black dispersion (1), as examples of the cationic surfactant or cationic polymer used in dispersing carbon black, may be mentioned surfactants such as lauryltrimethylammonium chloride, stearylbenzyldimethylammonium chloride; or polymers such as copolymers of N,N-dimethylaminoethyl methacrylate acetate and an acrylic ester, and copolymers of N,N-dimethylaminopropyl methacrylamide and styrene.

In the self-dispersing type carbon black dispersion (2), the hydrophilic group bonded directly or through another atomic group to the surface of carbon black is preferably composed of at least one aromatic group, for example, a phenyl, benzyl, phenacyl or naphthyl group, or heterocyclic group, for example, a pyridyl group, and at least one cationic group. More preferably, the cationic group bonded to the surface of carbon black is a quaternary ammonium group. Those having a quaternary phosphonium group in place of the quaternary ammonium group may also be used.

Specific examples of the hydrophilic group bonded to the surface of carbon black preferably used in the present invention include those having the following structures. However, the hydrophilic groups used in the present invention are not limited to these groups.

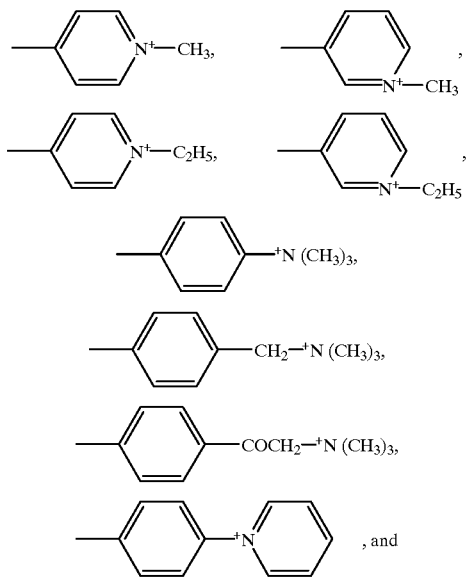

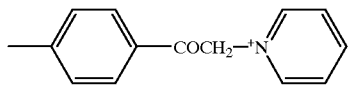

As a method for producing the cationic self-dispersing type carbon black with such a hydrophilic group as described above bonded to the surface thereof, a method for bonding, for example, an N-ethylpyridyl group having the following structure to the surface of carbon black includes a method in which carbon black is treated with 3-amino-N-ethylpyridinium bromide. It goes without saying that the present invention is not limited to this method.

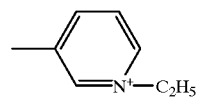

An anionic dispersion of carbon black may be prepared by (3) dispersing carbon black using a dispersing agent such as an anionic surfactant or anionic polymer. However, (4) a dispersion of a self-dispersing type carbon black like the self-dispersing type carbon black dispersion (2) is preferably used.

In the cationic carbon black dispersion (3), as examples of the anionic surfactant or anionic polymer used in dispersing carbon black, may be mentioned surfactants such as higher fatty acid salts and higher- alkyl sulfonic acid salts; or polymers such as styrene-acrylic acid copolymers and styrene-maleic acid copolymers.

In the self-dispersing type carbon black dispersion (4), as examples of the hydrophilic group bonded directly or through another atomic group to the surface of carbon black to impart anionic property to the carbon black, may be mentioned —COOM, —SO$_3$M and —SO$_2$NHCOR, wherein M is hydrogen, alkali metal, ammonium or organic ammonium, and R is an alkyl group having 1 to 12 carbon atoms, a phenyl group which may be substituted, or a naphthyl group which may be substituted. Of these, carbon black with —COOM or —SO$_3$M bonded to the surface thereof is preferably used in the present invention.

With respect to "M" in the above-described hydrophilic groups, examples of the alkali metal include lithium, sodium and potassium, and examples of the organic ammonium include mono-, di- and trimethylammonium, mono-, di- and triethylammonium, and mono-, di- and trimethanolammonium. As a method for obtaining the anionically charged carbon black, an example of a method for introducing —COONa in the surface of carbon black includes a method in which carbon black is subjected to an oxidation treatment with sodium hypochlorite. It goes without saying that the present invention is not limited to this method.

No particular limitation is imposed on the water-soluble black dye so far as it is a water-soluble dye having an anionic group, such as an acid dye, direct dye or reactive dye described in COLOR INDEX.

Any dye not described in COLOR INDEX may also be used without any particular limitation so far as it is an anionic water-soluble dye having an anionic group, for example, a sulfonic group or a carboxylic group, or a cationic water-soluble dye having a cationic group such as an amino group.

Among the water-soluble dyes used herein, those having dependence of solubility on pH may also be included as a matter of course.

No particular limitation is imposed on the content of the above-described carbon black or water-soluble black dye in the ink. However, it is preferably within a range of from 0.5 to 10.0% by weight, particularly, from 1.0 to 8.0 % by weight, based on the total weight of the ink. The content within this range permits a further improvement in reliability as ink-jet ink, for example, optical density and ejection stability of ink.

The concentrations of the coloring materials used for two black inks may be adjusted so as to differ from each other to suitably select inks to be used according to the kind of a recording medium to be used and the desired record image or to change proportions of inks to be used. For example, when a pigment ink and a dye ink are used as two black inks to conduct recording on a recording medium such as glossy paper or coated paper, it is preferable that the concentration of a coloring material used for the dye ink be made higher.

With respect to water-soluble polymers used in the ink sets according to the present invention, a cationic water-soluble polymer is preferably used for the cationic ink, while an anionic water-soluble polymer is preferably used for the anionic ink. When the water-soluble polymer is added into the ink, the water-soluble polymer serves as a binder for aggregate of the dye and pigment when recording of a black color is conducted, so that the rub-off resistance of the resulting print is improved.

Examples of the water-soluble polymers used in the present invention include the following polymers.

The anionic polymers include polyacrylic acid and alkali salts thereof, polymethacrylic acid and alkali salts thereof, styrene-acrylic acid copolymers and alkali salts thereof, styrene-acrylic acid-alkyl acrylate terpolymers and alkali salts thereof, styrene-maleic acid copolymer and alkali salts thereof, styrene-maleic acid-alkyl acrylate terpolymers and alkali salts thereof, styrene-methacrylic acid copolymers and alkali salts thereof, styrene-methacrylic acid-alkyl acrylate terpolymers and alkali salts thereof, styrene-maleic half ester copolymers and alkali salts thereof, vinylnapthalene-maleic acid copolymers and alkali salts thereof, alginic acid and alkali salts thereof, polysaccharides such as carboxymethyl cellulose, and alkali salts thereof, and polyvinyl sulfate and alkali salts thereof. The alkali salts include salts with alkali metals such as sodium, lithium and potassium, and besides ammonium salts, alkylamine salts and alkanolamine salts. These polymers may be used either singly or in any combination thereof.

The cationic polymers include polyalkyleneimines including polyethyleneimine and polyisopropyleneimine; polyamines including polyalkylene polyamine, polyamide polyamine epichlorohydrin; water-soluble aniline resins and salts thereof; polythiourea and salts thereof; water-soluble cationized amino resins; polyvinyl pyridine and salt thereof; and cationically modified products of polyacrylamide. These polymers may be used either singly or in any combination thereof.

The content of these water-soluble polymers in the ink is generally within a range of from 0.01 to 10% by weight, preferably from 0.1 to 5.0% by weight, based on the total weight of the ink.

Aqueous media used in the ink sets according to the present invention are composed of a mixed medium of water and a water-soluble organic solvent. Specific examples of the water-soluble organic solvent include amides such as dimethylformamide and dimethylacetamide; ketones such as acetone; ethers such as tetrahydrofuran and dioxane; poly-alkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethyl sulfoxide; cyclic amide compounds such as 2-pyrrolidone and $\epsilon$-caprolactam; and imide compounds such as succinimide.

The content of these water-soluble organic solvents in the inks is generally within a range of preferably from 1 to 80% by weight, more preferably from 3 to 50% by weight, based on the total weight of each ink. Purified water or ion-exchanged water is used as water, and the content of the water in the inks is generally within a range of preferably from 20 to 95% by weight, more preferably from 30 to 90% by weight, based on the total weight of each ink.

In the black inks of the ink sets according to the present invention, may be suitably incorporated additives such as surfactants, antiseptics, antioxidants, pH adjustors and water-soluble polymers in addition to the above-described components.

As coloring materials used for the color inks, may be used any dyes and pigments routinely used in color inks. Almost all acid dyes, direct dyes and reactive dyes may preferably be used. No particular limitation is imposed on the content of the coloring material in each color ink. However, it is preferably within a range of from 0.1 to 20 % by weight based on the total weight of the ink.

An aqueous medium used is composed of a mixed medium of water and an water-soluble organic solvent like the black inks. The content of the water-soluble organic solvent in each color ink is preferably within a range of from 1 to 80% by weight based on the total weight of the ink.

Purified water or ion-exchanged water is used as water, and the content of the water in the color inks is generally within a range of preferably from 20 to 95% by weight based on the total weight of each ink.

In the color inks, may be suitably incorporated additives such as surfactants, antiseptics, antioxidants, pH adjustors and water-soluble polymers in addition to the above-described components.

As the color inks, may be used color inks such as yellow, magenta and cyan inks. The color inks preferably have a surface tension lower than 40 dyn/cm.

The recording method using any one of the ink sets according to the present invention will hereinafter be described.

In the present invention, two black inks different in an ionicity are used as black inks, and any method may be used as the recording method so far as it is a method by which the two inks can be caused to coexist on a recording medium. No problem arises if either ink is first applied to the recording medium. When the surface tension of one black ink is adjusted to at least 40 dyn/cm, preferably, within a range of from 40 to 60 dyn/cm, and the surface tension of the other black ink is adjusted to lower than 40 dyn/cm, preferably, within a range of from 25 to 39 dyn/cm for the purpose of more improving the fixing ability of the inks, however, it is preferable that the ink having a higher surface tension be applied first.

The color ink(s) are preferably applied to the recording medium before or after the application of the two black inks.

It is not preferable to apply the color ink(s) between the application of the two black inks.

The recording method will hereinafter be described more specifically.

In the ink set according to the embodiment (1) or (2), two recording heads are provided for the respective black inks. In the ink set according to the embodiment (3), two recording heads for the black inks and three recording heads for the yellow, magenta and cyan inks are provided.

One of the recording heads for the black inks is used for the cationic black ink, and the other for the anionic black ink. For example, each 50% of both black inks is used for a region in which a black image is formed. No particular limitation is imposed on proportions of both inks used. It is however desirable that both inks be used in a ratio of from 1:9 to 9:1, preferably from 2:8 to 8:2 to form a black image. If the ratio is outside the above range, the effect of the coloring materials used for both inks on aggregation becomes insufficient, so that the desired effect cannot be achieved. As a method for causing both black inks to coexist on the recording medium, it is permissible either to apply both inks to a place corresponding to the same record dot on the recording medium or to alternately apply both inks to places corresponding to adjoining record dots. However, it is necessary to bring both inks into contact with each other on the recording medium.

No particular limitation is imposed on the time required from the time one black ink is applied to the recording medium up to the time the other black ink is then applied. In order to more effectively work the present invention, however, it is preferable to apply both black inks at an interval within several seconds, particularly preferably 3 seconds.

Recording apparatus useful in the practice of the present invention will hereinafter be described. As a preferred method and apparatus for conducting recording by using any one of the ink sets according to the present invention, may be mentioned a method and apparatus in which thermal energy corresponding to recording signals is applied to an ink within a recording head, and ink droplets are generated by the thermal energy.

Figure 2:
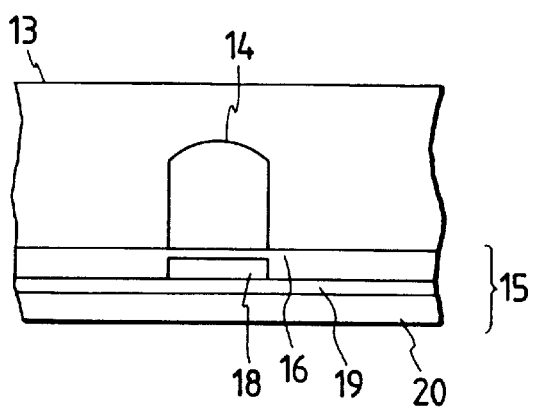
FIG. 2 is a transverse cross-sectional view of the head of the ink-jet recording apparatus.
Figure 3:
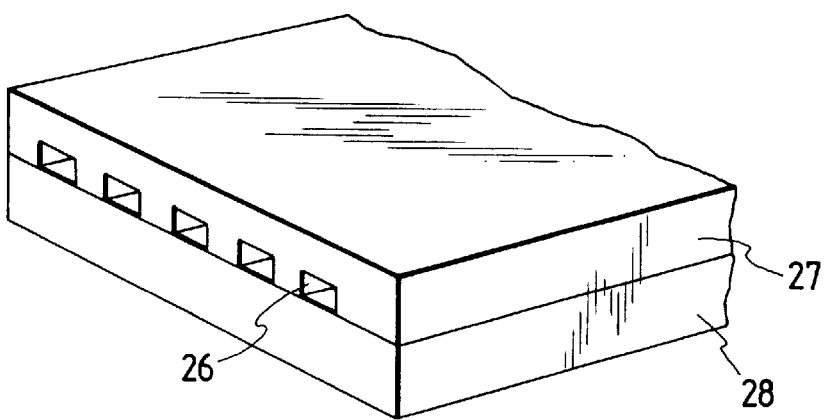
FIG. 3 is a perspective view of the appearance of a multi-head which is an array of such heads as shown in FIG. 1.

Examples of the construction of a recording head, which is a main component of such an apparatus, are illustrated in FIGS. 1, 2 and 3.

A head 13 is formed by bonding a glass, ceramic or plastic plate or the like having a groove 14 through which an ink is passed, to a heating head 15 having a heating resistor, which is used for thermal recording (the drawings show a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure not illustrated.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the ejection orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
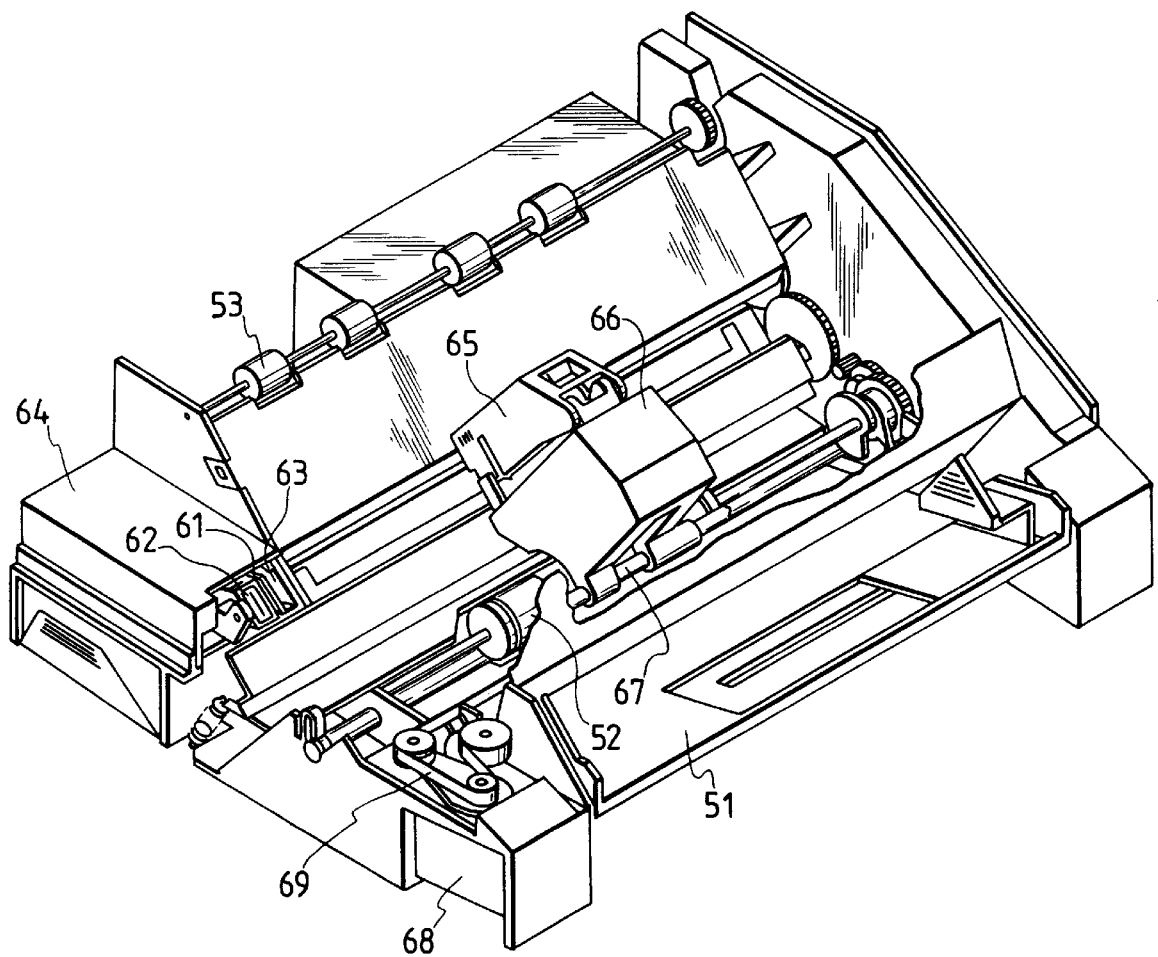
FIG. 4 is a perspective view illustrating an exemplary ink-jet recording apparatus.

FIG. 4 illustrates an example of an ink-jet recording apparatus in which the above head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for a face of ejection openings of the recording head 65, which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
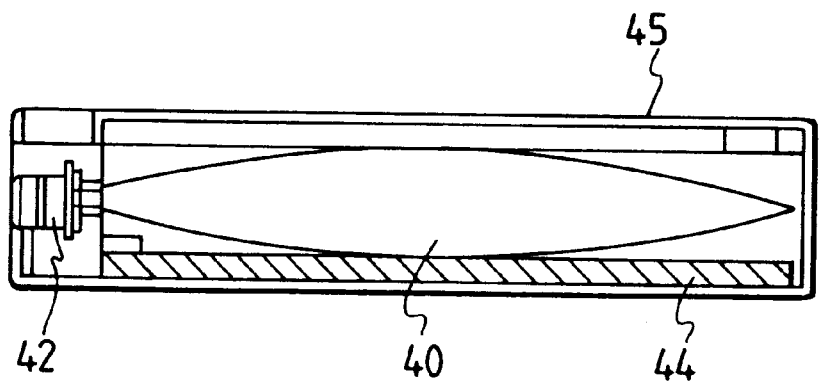
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
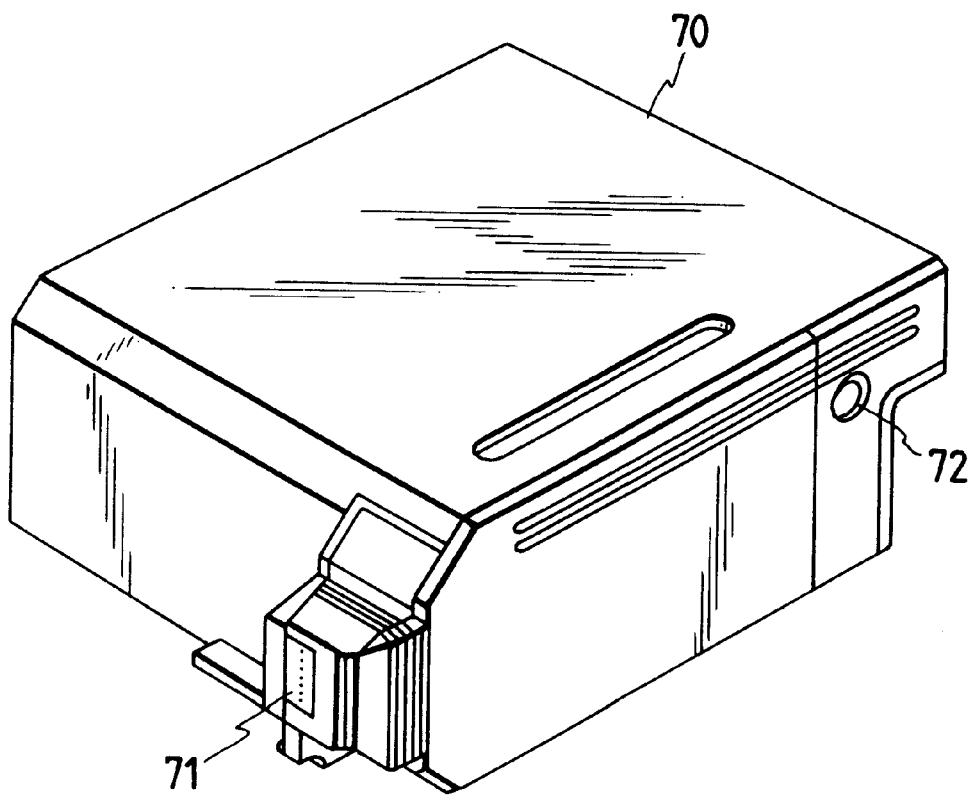
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetate is preferably used as a material for the ink-absorbing member.

Reference numeral 72 indicates an air passage for communicating the interior of the recording unit 70 with the atmosphere. This recording unit 70 can be used in place of the recording head 65 shown in FIG. 4, and is detachably installed on the carriage 66.

Incidentally, in the recording apparatus used in the present invention, the ink-jet recording apparatus in which thermal energy is applied to an ink to eject droplets of the ink has been described by way of example. However, the present invention can also be used in other ink-jet recording apparatus such as a piezo-system using a piezoelectric element.

Figure 7:
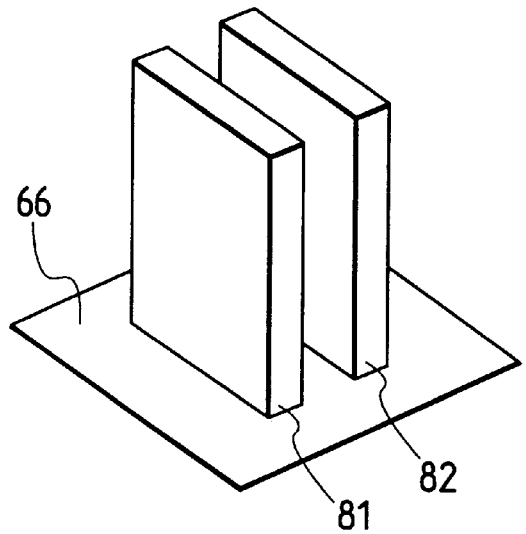
FIG. 7 is a perspective view illustrating a recording part used in the present invention, in which two recording heads are arranged.

In the case where the recording method according to the present invention is carried out, for example, a recording apparatus in which two recording heads, each of which has been illustrated in FIG. 3, are arranged on a carriage 66, is used for the ink sets according to the embodiments (1) and (2). An example thereof is illustrated in FIG. 7. Reference numerals 81 and 82 indicate recording heads for ejecting black inks different in ionicity, respectively. The recording heads are arranged in the above-described recording apparatus and serve to eject the respective inks in response to recording signals. FIG. 7 shows the case where the two recording heads have been used. However, the present invention is not limited thereto.

Figure 9:
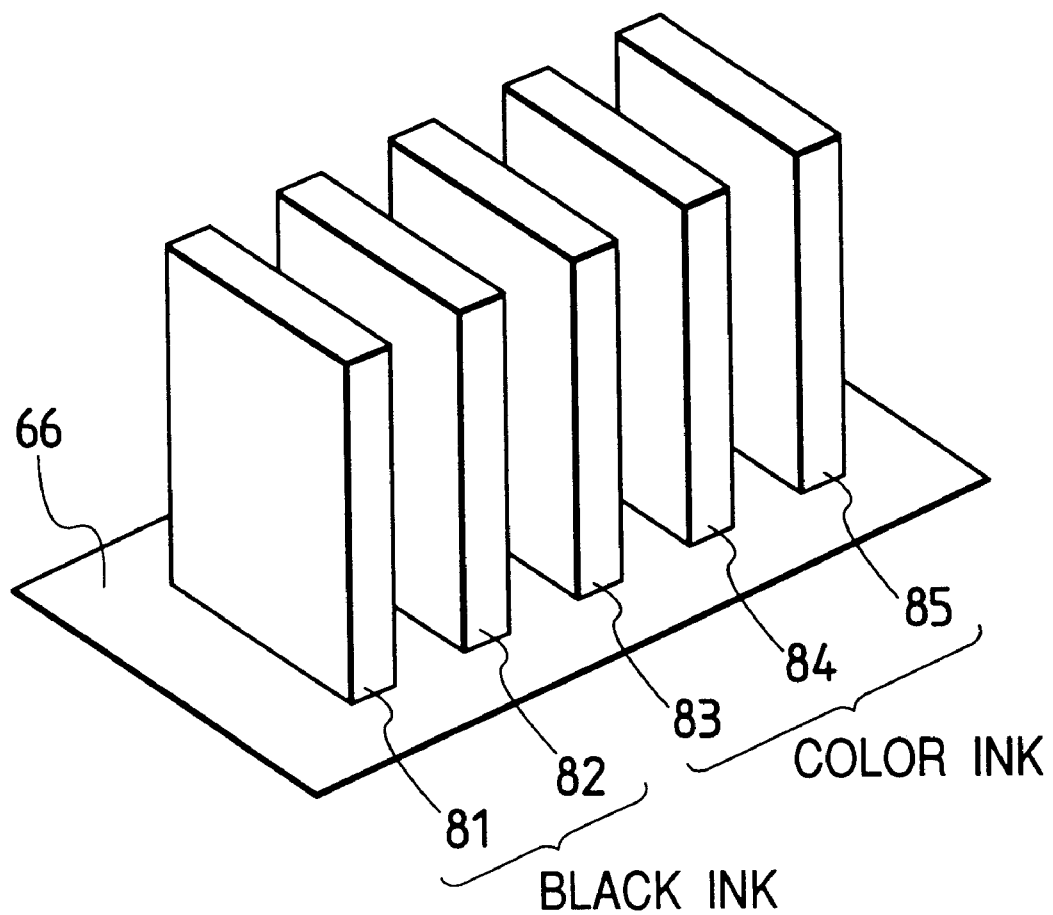
FIG. 9 is a perspective view illustrating a recording part used in the present invention, in which five recording heads are arranged.

On the other hand, for example, a recording apparatus in which five recording heads, each of which has been illustrated in FIG. 3, are arranged on a carriage 66, is used for the ink sets according to the embodiment (3). An example thereof is illustrated in FIG. 9. Reference numerals 81 and 82 indicate recording heads for black inks adapted for ejecting black inks different in ionicity, respectively, and reference numerals 83, 84 and 85 designate recording heads for ejecting inks of yellow, magenta and cyan colors, respectively. The recording heads are arranged in the above-described recording apparatus and serve to eject the respective inks in response to recording signals.

The present invention will hereinafter be described more specifically by the following Examples and Comparative Examples. Incidentally, all designations of "part" or "parts" and "%" as will be used in the following examples mean part or parts by weight and % by weight unless expressly noted.

First of all, the preparation of carbon black and pigment dispersions used in Examples and Comparative Examples will be described.

Carbon Black 1:

To a solution with 3.08 g of $H_3N^+C_6H_4N^+(CH_3)_3Cl^-.I^-$ dissolved in 30 g of water, were added 1.69 g of silver nitrate with stirring. Precipitate formed was removed by filtration, and the resultant filtrate was added with stirring to a suspension with 10 g of carbon black having a surface area of 230 m$^2$/g and a DBPA (oil absorption measured with dibutyl phthalate) of 70 ml/100 g dispersed in 70 g of water. After 2.25 g of concentrated hydrochloric acid were then added to the resultant mixture, a solution with 0.83 g of sodium nitrite dissolved in 10 g of water was added. As a result, a diazonium salt with an $NN^+C_6H_4N^+(CH_3)_3$ group having the following structure reacted to carbon black, thereby generating nitrogen gas. After the nitrogen gas ceased to bubble, the resultant dispersion was dried in an oven controlled to 120° C., thereby obtaining a product with a $C_6H_4N^+(CH_3)_3$ group bonded to the surface of the carbon black.

Carbon Black 2:

A solution containing 2.12 g of 4-acetaminophenacyl chloride, 0.83 g of pyridine and 6.4 g of dimethyl sulfoxide was stirred overnight. After 0.8 g of pyridine and 1 g of dimethyl sulfoxide were additionally added, the solution was stirred for additional 5 hours. After 50 ml of ether were added, acetamidophenacylpyridinium chloride formed was collected by filtration. After the thus-obtained acetamidophenacylpyridinium chloride was dissolved in water, and the resultant solution was filtered, 1.7 g of concentrated hydrochloric acid were added to the filtrate. After the solution was boiled for 1 hour, it was cooled, and acetone was added thereto. The resultant mixture was filtered to obtain 4-aminophenacylpyridinium chloride hydrochloride.

In 15 g of water, were dissolved 2 g of the thus-obtained 4-aminophenacylpyridinium chloride hydrochloride, and 4.5 g of a basic ion-exchange resin (Amberlite IRA400-OH) were added to the solution. After stirring the mixture, it was filtered to remove the ion-exchange resin, thereby obtaining an aqueous solution of 4-aminophenacylpyridinium chloride. The aqueous solution containing 1.3 g of 4-aminophenacylpyridinium chloride in 25 g of water was refluxed with 1 g of silver nitrate for 90 minutes. Precipitate formed was removed by filtration. To the resultant filtrate, were added 5 g of carbon black having a surface area of 200 m$^2$/g and a DBPA of 122 ml/100 g, and the resultant mixture was heated to about 80° C. After 0.52 g of concentrated hydrochloric acid were added, a solution of sodium nitrite in a small amount of water was added, and the resultant dispersion was stirred for 1.5 hours. As a result, a diazonium salt with an $NN^+C_6H_4COCH_2(N^+C_5H_5)$ group having the following structure was formed and reacted to carbon black, thereby obtaining a product with a $C_6H_4COCH_2(N^+C_5H_5)$ group bonded to the surface of the carbon black.

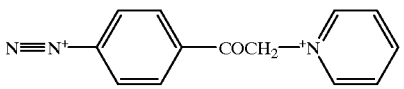

Pigment Dispersion 1:

Fifteen parts of a styrene-acrylic acid-ethyl acrylate terpolymer (acid value: 174; weight average molecular weight: 18,000), 4.5 parts of monoethanolamine, 5 parts of ethylene glycol and 57 parts of water were mixed, and the mixture was heated to 70° C. in a water bath, thereby completely dissolving the resin. At this time, the resin may not be completely dissolved if the concentration of the resin to be dissolved is low. Therefore, the desired resin solution may also be prepared by preparing a high-concentration solution in advance and diluting this solution. To this solution, were added 10 parts of carbon black (MCF-88, trade name; pH: 8.0; product of Mitsubishi Chemical Industries Limited) and 5 parts of ethanol to premix the components for 30 minutes. Thereafter, the resultant premix was subjected to a dispersion treatment under the following conditions.

Dispersing machine: sand grinder (manufactured by Igarashi Kikai K.K.)

Grinding medium: zirconium beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 1. This dispersion is a dispersion containing carbon black dispersed with the anionic resin.

Pigment Dispersion 2:

After 300 g of acid carbon black ("MA-8", trade name; product of Mitsubishi Chemical Industries Limited) were thoroughly mixed with 1,000 ml of water, 450 g of sodium hypochlorite (available chlorine concentration: 12%) were added dropwise to the mixture. The resultant mixture was stirred for 8 hours at 100 to 105° C. to oxidize the carbon black. The resultant slurry was filtered through Toyo Filter Paper No. 2 and then fully washed with water to remove salts by-produced. The resultant wet cake was dispersed again in 3,000 ml of water, and the dispersion was purified and concentrated with a reverse osmosis membrane to obtain Pigment Dispersion 2 containing the pigment at a concentration of 10% by weight. According to this process, a self-dispersing type anionic carbon black with a group —COONa bonded to the surface of the carbon black was obtained, and such carbon black was dispersed in a stable state in Pigment Dispersion 2.

Pigment Dispersion 3:

Two parts of a poly-N,N'-dimethyl-3,5-methylenepiperidinium salt (Mw: 3,700), 5 parts of diethylene glycol and 78 parts of ion-exchanged water were mixed, and the mixture was heated to 70° C. in a water bath, thereby completely dissolving the resin. To this solution, were added 15 parts of carbon black having a surface area of 180 m$^2$/g and a DBPA of 122 ml/100 g to premix the components for 30 minutes. Thereafter, the resultant premix was subjected to a dispersion treatment under the following conditions.

Dispersing machine: sand grinder (manufactured by Igarashi Kikai K.K.)

Grinding medium: zirconium beads (diameter: 1 mm)

Packing rate of grinding medium: 50% (by volume)

Grinding time: 3 hours.

The thus-treated mixture was further subjected to a centrifugal treatment (12,000 rpm, 20 minutes) to remove coarse particles, thereby obtaining Pigment Dispersion 3. This dispersion is a dispersion containing carbon black dispersed with the cationic resin.

Pigment Dispersion 4:

After 300 g of commercially available acid carbon black ("MA-77", trade name; pH: 3.0; product of Mitsubishi Chemical Industries Limited) were thoroughly mixed with 1,000 ml of water, 450 g of sodium hypochlorite (available chlorine concentration: 12%) were added dropwise to the mixture, and the mixture was stirred for 10 hours at 100 to 105° C. The resultant slurry was filtered through Toyo Filter Paper No. 2 (product of Advantes Co.), and the resultant pigment particles were fully washed with water. The wet cake of this pigment was dispersed again in 3,000 ml of water, and the dispersion was desalted by means of a reverse osmosis membrane to a conductivity of 0.2 µs. The pigment dispersion (pH: 8 to 10) was concentrated to a pigment concentration of 10% by weight. The above-described process was followed to obtain Pigment Dispersion 4 in which a self-dispersing type carbon black anionically charged with a hydrophilic group —COO⁻ directly bonded to the surface of the carbon black was dispersed. Pigment Dispersion 5:

After 10 g of carbon black having a surface area of 230 m$^2$/g and a DBP oil absorption of 70 ml/100 g and 3.41 g of p-aminobenzoic acid were thoroughly mixed with 72 g of water, 1.62 g of nitric acid were added dropwise thereto, and the resultant mixture was stirred at 70° C. After several minutes, a solution of 1.07 g of sodium nitrite in 5 g of water was further added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 90° C. Water was then added to the dried pigment to prepare an aqueous dispersion containing the pigment at a concentration of 10% by weight. The above-described process was followed to obtain Pigment Dispersion 5 in which a self-dispersing type carbon black anionically charged with a hydrophilic group bonded to the surface of the carbon black through a phenyl group as shown below was dispersed.

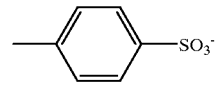

Pigment Dispersion 6:

To a solution of 5 g of concentrated hydrochloric acid in 5.3 g of water, were added 1.58 g of anthranilic acid at 5° C. The mixture was stirred in an ice bath, thereby always holding it at 10° C. or lower. In this state, a solution with 1.78 g of sodium nitrite dissolved in 8.7 g of water at 5° C. was added. After stirring the resultant mixture for 15 minutes, 20 g of carbon black having a surface area of 320 m$^2$/g and a DBP oil absorption of 120 ml/100 g were added to the mixture with stirring. The resultant mixture was then stirred for additional 15 minutes. The resultant slurry was filtered through Toyo Filter Paper No. 2 (product of Advantes Co.), and the resultant pigment particles were fully washed with water and dried in an oven controlled to 110° C. Water was added to the dried pigment to prepare an aqueous dispersion containing the pigment at a concentration of 10% by weight. The above-described process was followed to obtain Pigment Dispersion 6 in which a self-dispersing type carbon black anionically charged with a hydrophilic group bonded to the surface of the carbon black through a phenyl group as shown below was dispersed.

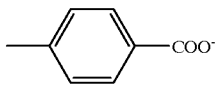

EXAMPLES 1 TO 5 AND COMPARATIVE EXAMPLES 1 AND 2

Ink sets according to Examples 1 to 5 were respectively prepared by combining two inks as black inks with each. Each ink was prepared in the following manner. After its corresponding components described below were mixed into a solution, the solution was filtered under reduced pressure through a microfilter (product of Fuji Photo Film Co., Ltd.) having a pore size of 3.0 μm, with regard to black inks of Examples 1 to 5, thereby preparing inks.

Example 1

| Black Ink A: | |
| --- | --- |
| Carbon Black 1 (cationic) | 4 parts |
| Diethylene glycol | 15 parts |
| Water | 81 parts. |
| Black Ink B: | |
| Pigment Dispersion 2 (anionic) | 30 parts |
| Glycerol | 5 parts |
| Triethylene glycol | 5 parts |
| Ethanol | 4 parts |
| Water | 56 parts. |

The above-described Black Inks A and B had surface tensions of 52 dyn/cm and 49 dyn/cm, respectively.

Example 2

| Black Ink A: | |
| --- | --- |
| Pigment Dispersion 1 (anionic) | 30 parts |
| Glycerol | 5 parts |
| 2-Pyrrolidone | 5 parts |
| Isopropyl alcohol | 3 parts |
| Water | 57 parts. |
| Black Ink B: | |
| Pigment Dispersion 3 (cationic) | 20 parts |
| Diethylene glycol | 10 parts |
| Ethylene glycol | 5 parts |
| Water | 65 parts. |

The above-described Black Inks A and B had surface tensions of 50 dyn/cm and 46 dyn/cm, respectively.

Example 3

| Black Ink A: | |
| --- | --- |
| Carbon Black 2 (cationic) | 5 parts |
| Triethylene glycol | 5 parts |
| 1,5-Pentanediol | 5 parts |
| Isopropyl alcohol | 4 parts |
| Water | 81 parts. |
| Black Ink B: | |
| Pigment Dispersion 2 (anionic) | 30 parts |
| Glycerol | 5 parts |
| Triethylene glycol | 5 parts |
| Diethylene glycol | 4 parts |
| Triethylene glycol monobutyl ether | 4 parts |
| Water | 52 parts. |

The above-described Black Inks A and B had surface tensions of 48 dyn/cm and 38 dyn/cm, respectively.

Example 4

| Black Ink A: | |
| --- | --- |
| Carbon Black 2 (cationic) | 5 parts |
| Diethylene glycol | 5 parts |
| 1,5-Pentanediol | 5 parts |
| Isopropyl alcohol | 4 parts |
| Water | 81 parts. |
| Black Ink B: | |
| Pigment Dispersion 2 (anionic) | 30 parts |
| Glycerol | 5 parts |
| Triethylene glycol | 5 parts |
| Acetylenol EH (trade name, product of Kawaken Fine Chemicals Co., Ltd.) | 0.7 parts |
| Water | 59.3 parts. |

The above-described Black Inks A and B had surface tensions of 47 dyn/cm and 32 dyn/cm, respectively.

Example 5

| Black Ink A: | |
| --- | --- |
| Astrazon Black FDL (cationic, product of Dystar Co.) | 5 parts |
| Glycerol | 5 parts |
| Diethylene glycol | 7 parts |
| Ethanol | 3 parts |
| Water | 80 parts. |
| Black Ink B: | |
| C.I. Direct Black 195 (anionic) | 3 parts |
| Glycerol | 5 parts |
| Thiodiglycol | 5 parts |
| Sodium hydroxide | 0.5 parts |
| Diethylene glycol | 5 parts |
| Water | 81.5 parts. |

The above-described Black Inks A and B had surface tensions of 48 dyn/cm and 47 dyn/cm, respectively.

Comparative Example 1

Black Ink A prepared in Example 1 was used in two recording heads to conduct recording.

Comparative Example 2

Black Ink B prepared in Example 1 was used in two recording heads to conduct recording.

The respective inks of the above-described Examples and Comparative Examples were used to conduct recording on commercially available paper for copying (Canon PB paper and Xerox 4024 paper) and bond paper (Plover Bond).

As an ink-jet recording apparatus, was used a recording apparatus similar to that shown in FIG. 4. Images were formed using 2 recording heads as illustrated in FIG. 7. Incidentally, the recording heads used herein were the same recording heads as that used in BJC820 (trade name, ink-jet printer manufactured by Canon Inc.). Drive conditions for the recording heads, namely, energizing conditions for a heater in each head were as follows:

Applied voltage: 28 V

Pulse width: 3.2 μsec

Drive frequency: 5 kHz.

In the present invention, two black inks, i.e., Black Ink A and Black Ink B are used as black inks. Therefore, Black Ink A was used in one recording head, and Black Ink B in the other recording head to conduct the recording. In Comparative Examples, one and the same black ink was used in two recording heads to conduct the recording.

Figure 8:
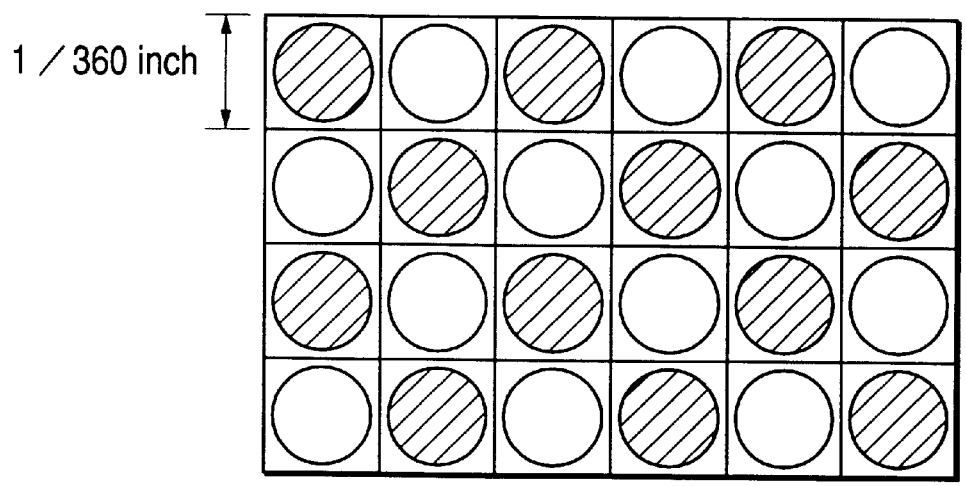
FIG. 8 illustrates an exemplary method for forming record dots.
Figure 8:
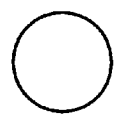
Figure 8:
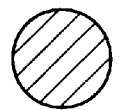

In each example, the record image was formed by using the two recording heads to make a record of 50% duty by one recording head and make the remaining record of 50% duty by the other recording head so as to give 100% duty. Record dots were formed by such a method as illustrated in FIG. 8. In FIG. 8, open circles are record dots formed by Black Ink A, and hatched circles are record dots formed by Black Ink B. Incidentally, in Examples 3 and 4, a black ink having a higher surface tension was charged into a leading recording head in order that the black ink may impact first on a recording medium.

The record images obtained in Examples 1 to 5 and Comparative Examples 1 and 2 were evaluated as to optical density and fixing ability. The results thereof are shown in Table 1. The evaluation of the record images was conducted in accordance with the following respective methods.

[Optical density]

English characters and numerals and a solid print were recorded on commercially available paper for copying (Canon PB paper and Xerox 4024 paper) and bond paper (Plover Bond). After left to stand for 1 hour, its optical density was measured by a Macbeth RD915 (trade name, manufactured by Macbeth Company), and evaluation was made in accordance with the following standard:

A: Density was not lower than 1.25;

B: Density was from 1.15 to 1.25; and

C: Density was lower than 1.15.

[Fixing ability]

A solid print was recorded on commercially available paper for copying (Canon PB paper and Xerox 4024 paper) and bond paper (Plover Bond). After the recording, the time by which staining no longer occurred even when the solid print area was rubbed with fingers was measured. Evaluation was made in accordance with the following standard:

A: Staining no longer occurred in shorter than 30 seconds;

B: Staining no longer occurred in from 30 to 50 seconds.

C: Marked staining occurred even in longer than 50 seconds.

TABLE 1

|  | Optical density | | | Fixing |
| --- | --- | --- | --- | --- |
|  | PB paper | Xerox 4024 paper | Bond paper | ability |
| Ex. 1 | A | A | A | B |
| Ex. 2 | A | A | A | B |
| Ex. 3 | A | A | A | A |

TABLE 1-continued

|  | Optical density | | | Fixing |
| --- | --- | --- | --- | --- |
|  | PB paper | Xerox 4024 paper | Bond paper | ability |
| Ex. 4 | A | A | A | A |
| Ex. 5 | A | A | A | A |
| Comp. Ex. 1 | C | B | A | B |
| Comp. Ex. 2 | C | B | B | B |

EXAMPLES 6 TO 11 AND COMPARATIVE EXAMPLES 3 AND 4

Ink sets according to Examples 6 to 11 were respectively prepared by combining two inks as black inks with each.

Each ink was prepared in the following manner. After its corresponding components described below were mixed into a solution, the solution was filtered under reduced pressure through a microfilter (product of Fuji Photo Film Co., Ltd.) having a pore size of 3 μm when the ink was a pigment ink, or through a microfilter (product of Fuji Photo Film Co., Ltd.) having a pore size of 0.2 μm when the ink was a dye ink, thereby preparing inks.

Example 6

| Cationic black ink: | |
| --- | --- |
| Carbon Black 1 (cationic) | 4.0 parts |
| Glycerol | 5.0 parts |
| Triethylene glycol | 5.0 parts |
| Polyallylamine | 3.0 parts |
| Water | 83.0 parts. |
| Anionic black ink: | |
| C.I. Direct Black 195 | 2.5 parts |
| Glycerol | 5.0 parts |
| Diethylene glycol | 5.0 parts |
| Sodium hydroxide | 0.5 parts |
| Water | 87.0 parts. |

The above-described cationic black ink and anionic black ink had surface tensions of 52 dyn/cm and 46 dyn/cm, respectively.

Example 7

| Cationic black ink: | |
| --- | --- |
| Carbon Black 2 (cationic) | 4.0 parts |
| Glycerol | 5.0 parts |
| Diethylene glycol | 5.0 parts |
| Polyethylene polyamine | 2.0 parts |
| Water | 84.0 parts. |
| Anionic black ink: | |
| C.I. Food Black 2 | 3.0 parts |
| Glycerol | 5.0 parts |
| Ethylene glycol | 7.0 parts |
| Triethylene glycol | 4.0 parts |
| Sodium polyacrylate | 0.5 parts |
| Water | 78.5 parts. |

The above-described cationic black ink and anionic black ink had surface tensions of 51 dyn/cm and 43 dyn/cm, respectively.

Example 8

| Cationic black ink: | |
|---|---|
| Pigment Dispersion 3 (cationic) | 30.0 parts |
| Glycerol | 7.0 parts |
| 2-Pyrrolidone | 5.0 parts |
| Isopropyl alcohol | 3.0 parts |
| Water | 55.0 parts. |
| Anionic black ink: | |
| C.I. Direct Black 195 | 2.5 parts |
| Glycerol | 5.0 parts |
| Diethylene glycol | 5.0 parts |
| Ethylene glycol | 5.0 parts |
| Acetylenol EH (trade name, product of Kawaken Fine Chemicals Co., Ltd.) | 0.5 parts |
| Water | 82.0 parts. |

The above-described cationic black ink and anionic black ink had surface tensions of 48 dyn/cm and 33 dyn/cm, respectively.

Example 9

| Cationic black ink: | |
|---|---|
| Astrazon Black SW (trade name, product of Bayer AG) | 5.0 parts |
| Glycerol | 5.0 parts |
| Ethylene glycol | 7.0 parts |
| Polyethyleneimine | 1.0 parts |
| Water | 82.0 parts. |
| Anionic black ink: | |
| Pigment Dispersion 2 (anionic) | 30.0 parts |
| Ethylene glycol | 5.0 parts |
| Triethylene glycol | 10.0 parts |
| Sodium polymethacrylate | 0.5 parts |
| Water | 54.5 parts. |

The above-described cationic black ink and anionic black ink had surface tensions of 48 dyn/cm and 52 dyn/cm, respectively.

Example 10

| Cationic black ink: | |
|---|---|
| Kayacel Black CN (trade name, product of Nippon Kayaku Co., Ltd.) | 5.0 parts |
| Ethylene glycol | 10.0 parts |
| Triethylene glycol | 5.0 parts |
| Polyisopropyleneimine | 0.5 parts |
| Water | 80.5 parts. |
| Anionic black ink: | |
| Pigment Dispersion 1 (anionic) | 25.0 parts |
| Ethylene glycol | 7.0 parts |
| Triethylene glycol | 8.0 parts |
| Water | 60.0 parts. |

The above-described cationic black ink and anionic black ink had surface tensions of 50 dyn/cm and 53 dyn/cm, respectively.

Example 11

| Cationic black ink: | |
|---|---|
| Kayacel Black CN (trade name, product of Nippon Kayaku Co., Ltd.) | 4.0 parts |
| Glycerol | 7.0 parts |
| Ethylene glycol | 5.0 parts |
| Urea | 5.0 parts |
| Water | 79.0 parts. |
| Anionic black ink: | |
| Pigment Dispersion 2 (anionic) | 30.0 parts |
| Ethylene glycol | 5.0 parts |
| Triethylene glycol | 10.0 parts |
| Water | 55.0 parts. |

The above-described cationic black ink and anionic black ink had surface tensions of 48 dyn/cm and 54 dyn/cm, respectively.

Comparative Example 3

Only the cationic black ink prepared in Example 6 was used to conduct recording.

Comparative Example 4

Only the anionic black ink prepared in Example 11 was used to conduct recording.

The respective inks of the above-described Examples and Comparative Examples were used to conduct recording on commercially available paper for copying (Canon PB paper and Xerox 4024 paper) and bond paper (Plover Bond).

As an ink-jet recording apparatus, was used a recording apparatus similar to that shown in FIG. 4. Images were formed using 2 recording heads as illustrated in FIG. 7. Incidentally, the recording heads used herein were the same recording heads as that used in BJC820 (trade name, ink-jet printer manufactured by Canon Inc.). Drive conditions for the recording heads, namely, energizing conditions for a heater in each head were as follows:

Applied voltage: 28 V
Pulse width: 3.2 μsec
Drive frequency: 5 kHz.

In the present invention, two black inks, i.e., a cationic black ink and an anionic black ink are used as black inks. Therefore, the cationic black ink was used in one recording head, and the anionic black ink in the other recording head to conduct the recording. In Comparative Examples, one and the same black ink was used in two recording heads to conduct the recording.

In each example, the record image was formed by using the two recording heads to make a record of 50% duty by one recording head and make the remaining record of 50% duty by the other recording head so as to give 100% duty. Record dots were formed by such a method as illustrated in FIG. 8.

The record images obtained in Examples 6 to 11 and Comparative Examples 3 and 4 were evaluated as to optical density, water fastness and fixing ability. The results thereof are shown in Table 2. The evaluation of the record images as to the water fastness was conducted in accordance with the following method. The evaluation as to the other properties was conducted in the same manner as in Example 1.

[Water fastness]

After English characters and numerals and solid prints were recorded on commercially available paper for copying (Canon PB paper and Xerox 4024 paper) and bond paper (Plover Bond), and the resulting samples were left to stand for a predetermined period of time, water was dropped on each print area with a dropping pipette to measure the time by which ink running toward the blank portion of the recording medium and blurring of the English characters and numerals occurred no longer. Evaluation was made in accordance with the following standard:

A: Neither ink running toward the blank portion nor blurring of the English characters and numerals occurred in 5 minutes after the recording;

B: Neither ink running toward the blank portion nor blurring of the English characters and numerals occurred in 1 hour after the recording;

C: Both ink running toward the blank portion and blurring of the English characters and numerals occurred even in 1 hour or longer after the recording.

TABLE 2

|  | Optical density | | | Water fastness | Fixing ability |
| --- | --- | --- | --- | --- | --- |
|  | PB paper | Xerox 4024 paper | Bond paper | | |
| Ex. 6 | A | A | A | A | B |
| Ex. 7 | A | A | A | A | B |
| Ex. 8 | A | A | A | A | A |
| Ex. 9 | A | A | A | A | B |
| Ex. 10 | A | A | A | B | B |
| Ex. 11 | A | A | A | B | B |
| Comp. Ex. 3 | C | B | A | C | B |
| Comp. Ex. 4 | C | B | B | C | B |

EXAMPLES 12 TO 16 AND COMPARATIVE EXAMPLE 5

Ink sets according to Examples 12 to 16 were respectively prepared by combining two pigments inks as black inks with each and using yellow, magenta and cyan inks as color inks. Each ink was prepared in the following manner. After its corresponding components described below were stirred into a solution, the solution was filtered under reduced pressure through a microfilter (product of Fuji Photo Film Co., Ltd.) having a pore size of 3 μm when the ink was a black ink, or through a microfilter (product of Fuji Photo Film Co., Ltd.) having a pore size of 0.2 μm when the ink was a color ink, thereby preparing inks.

Example 12

Black Ink $A_1$:

| | |
| --- | --- |
| Carbon Black 1 (cationic) | 5 parts |
| Ethylene glycol | 9 parts |
| Diethylene glycol | 5 parts |
| Water | 81 parts |

Black Ink $B_1$:

| | |
| --- | --- |
| Pigment Dispersion 4 (anionic) | 30 parts |
| Triethylene glycol | 7 parts |
| Diethylene glycol | 5 parts |
| Water | 58 parts |

Yellow ink:

| | |
| --- | --- |
| C.I. Direct Yellow 86 | 2 parts |
| Glycerol | 5 parts |
| Thiodiglycol | 5 parts |
| Diethylene glycol | 5 parts |
| Acetylenol EH | 0.7 parts |
| Water | 82.3 parts. |

Magenta ink:

| | |
| --- | --- |
| C.I. Acid Red 54 | 3 parts |
| Glycerol | 5 parts |
| Thiodiglycol | 5 parts |
| Diethylene glycol | 5 parts |
| Acetylenol EH | 0.7 parts |
| Water | 81.3 parts. |

Cyan ink:

| | |
| --- | --- |
| C.I. Direct Blue 199 | 3 parts |
| Glycerol | 5 parts |
| Thiodiglycol | 5 parts |
| Diethylene glycol | 5 parts |
| Acetylenol EH | 0.7 parts |
| Water | 81.3 parts. |

Example 13

Black Ink $A_1$:

| | |
| --- | --- |
| Carbon Black 2 (cationic) | 5 parts |
| Ethylene glycol | 9 parts |
| Diethylene glycol | 5 parts |
| Water | 81 parts. |

Black Ink $B_1$:

| | |
| --- | --- |
| Pigment Dispersion 5 (anionic) | 30 parts |
| Triethylene glycol | 7 parts |
| Diethylene glycol | 5 parts |
| Water | 58 parts. |

Yellow ink:

| | |
| --- | --- |
| C.I. Direct Yellow 132 | 3 parts |
| Glycerol | 5 parts |
| Thiodiglycol | 5 parts |
| Diethylene glycol | 9 parts |
| Isopropyl alcohol | 7 parts |
| Water | 71 parts. |

Magenta ink:

| | |
| --- | --- |
| C.I. Acid Red 94 | 3 parts |
| Glycerol | 5 parts |
| Thiodiglycol | 5 parts |
| Diethylene glycol | 9 parts |
| Acetylenol EH | 7 parts |
| Water | 71 parts. |

Cyan ink:

| | |
| --- | --- |
| C.I. Acid Blue 9 | 3 parts |
| Glycerol | 5 parts |
| Thiodiglycol | 5 parts |
| Diethylene glycol | 9 parts |
| Isopropyl alcohol | 7 parts |
| Water | 71 parts. |

Example 14

Black Ink $A_1$:

| | |
| --- | --- |
| Pigment Dispersion 3 (cationic) | 20 parts |
| Polyethylene glycol | 9 parts |
| Diethylene glycol | 5 parts |
| Water | 66 parts. |

-continued

Black Ink B₁:

| | | |
|---|---|---|
| Pigment Dispersion 1 (anionic) | 30 | parts |
| Triethylene glycol | 7 | parts |
| Diethylene glycol | 5 | parts |
| Water | 58 | parts. |

Yellow ink:

| | | |
|---|---|---|
| C.I. Direct Yellow 142 | 2 | parts |
| Glycerol | 5 | parts |
| Thiodiglycol | 5 | parts |
| Diethylene glycol | 5 | parts |
| Polyoxyethylene lauryl ether | 2 | parts |
| Water | 81 | parts. |

Magenta ink:

| | | |
|---|---|---|
| C.I. Acid Red 35 | 3 | parts |
| Glycerol | 5 | parts |
| Thiodiglycol | 5 | parts |
| Diethylene glycol | 5 | parts |
| Polyoxyethylene lauryl ether | 2 | parts |
| Water | 80 | parts. |

Cyan ink:

| | | |
|---|---|---|
| C.I. Direct Blue 86 | 3 | parts |
| Glycerol | 5 | parts |
| Thiodiglycol | 5 | parts |
| Diethylene glycol | 5 | parts |
| Polyoxyethylene lauryl ether | 2 | parts |
| Water | 80 | parts. |

Example 15

Black Ink A₁:

| | | |
|---|---|---|
| Carbon Black 1 (cationic) | 5 | parts |
| 1,5-Pentanediol | 9 | parts |
| Diethylene glycol | 5 | parts |
| Water | 81 | parts. |

Black Ink B₁:

| | | |
|---|---|---|
| Pigment Dispersion 6 (anionic) | 30 | parts |
| Triethylene glycol | 7 | parts |
| Diethylene glycol | 5 | parts |
| Acetylenol EH | 0.7 | parts |
| Water | 57.3 | parts. |

Yellow ink:

| | | |
|---|---|---|
| C.I. Direct Yellow 142 | 2 | parts |
| Glycerol | 5 | parts |
| Thiodiglycol | 5 | parts |
| Diethylene glycol | 5 | parts |
| Triethylene glycol monobutyl ether | 5 | parts |
| Water | 78 | parts. |

Magenta ink:

| | | |
|---|---|---|
| C.I. Acid Red 35 | 3 | parts |
| Glycerol | 5 | parts |
| Thiodiglycol | 5 | parts |
| Diethylene glycol | 5 | parts |
| Triethylene glycol monobutyl ether | 5 | parts |
| Water | 77 | parts. |

Cyan ink:

| | | |
|---|---|---|
| C.I. Direct Blue 86 | 3 | parts |
| Glycerol | 5 | parts |
| Thiodiglycol | 5 | parts |
| Diethylene glycol | 5 | parts |
| Triethylene glycol monobutyl ether | 5 | parts |
| Water | 77 | parts. |

Example 16

Black Ink A₁:

| | | |
|---|---|---|
| ASTRAZON BLACK FDL (cationic, product of DYSTAR Co.) | 5 | parts |
| Diethylene glycol | 9 | parts |
| Ethylene glycol | 5 | parts |
| Ethanol | 3 | parts |
| Water | 78 | parts. |

Black Ink B₁:

| | | |
|---|---|---|
| C.I. Direct Black 195 (anionic) | 2.5 | parts |
| Glycerol | 7 | parts |
| Ethylene glycol | 5 | parts |
| Sodium hydroxide | 0.5 | parts |
| Water | 85 | parts. |

Yellow ink:

| | | |
|---|---|---|
| C.I. Direct Yellow 86 | 2 | parts |
| Glycerol | 5 | parts |
| Thiodiglycol | 5 | parts |
| Diethylene glycol | 5 | parts |
| Acetylenol EH | 0.7 | parts |
| Water | 82.3 | parts. |

Magenta ink:

| | | |
|---|---|---|
| C.I. Acid Red 54 | 3 | parts |
| Glycerol | 5 | parts |
| Thiodiglycol | 5 | parts |
| Diethylene glycol | 5 | parts |
| Acetylenol EH | 0.7 | parts |
| Water | 81.3 | parts. |

Cyan ink:

| | | |
|---|---|---|
| C.I. Direct Blue 199 | 3 | parts |
| Glycerol | 5 | parts |
| Thiodiglycol | 5 | parts |
| Diethylene glycol | 9 | parts |
| Acetylenol EH | 0.7 | parts |
| Water | 81.3 | parts. |

The surface tensions of the inks in each example are shown in Table 3.

Comparative Example 5

Only Black Ink $B_1$ of the black inks prepared in Example 14 was used to conduct recording.

The respective inks of the above-described Examples and Comparative Example were used to conduct recording on commercially available paper for copying (Canon PB paper and Xerox 4024 paper) and bond paper (Plover Bond).

As an ink-jet recording apparatus, was used a recording apparatus similar to that shown in FIG. 4. Images were formed using 5 recording heads as illustrated in FIG. 9. Incidentally, the recording heads used herein were the same recording heads as that used in BJC820 (trade name, ink-jet printer manufactured by Canon Inc.). Drive conditions for the recording heads, namely, energizing conditions for a heater in each head were as follows:

Applied voltage: 28 V

Pulse width: 3.2 μsec

Drive frequency: 5 kHz.

In the present invention, two black inks, i.e., Black Ink $A_1$ and Black Ink $B_1$ are used as black inks. Therefore, Black Ink $A_1$ was used in one recording head, and Black Ink $B_1$ in another recording head to conduct the recording. Further, the yellow, magenta and cyan inks were separately used in other three recording heads.

In Comparative Example, one and the same black ink was used in two recording heads for black inks to conduct the recording.

In each example, the record image of a black color was formed by using the two recording heads to make a record of 50% duty by one recording head and make the remaining record of 50% duty by another recording head so as to give 100% duty. Record dots were formed by such a method as illustrated in FIG. 8. The dot-forming method is an example, and the present invention is not limited to this method.

Incidentally, a black ink having a higher surface tension was charged into a leading recording head in order that the black ink may impact first on a recording medium. Besides, with respect to the relationship between the black inks and the color inks, the recording was conducted in such a manner that the black inks impact first on the recording medium.

The record images obtained in Examples 12 to 16 and Comparative Example 5 were evaluated as to quality of black characters, and bleeding and white haze between black ink and color ink. The results thereof are shown in Table 4.

The evaluation of the record images was conducted in accordance with the following respective methods.

[Quality of black characters]

English characters and numerals and solid prints were recorded on the above-described plain paper. Thereafter, the record samples were observed to evaluate them as to density, and feathering and sharpness of characters in accordance with the following standard:

A: High in density, free of any feathering and sharp in characters;

B: Density was fairly high, but feathering slightly occurred;

C: Density was low, and feathering considerably occurred.

[Bleeding]

Solid prints of black, yellow, magenta and cyan colors were recorded in contiguity with one another on the above-described plain paper to observe the degree of bleeding at boundaries between the black ink and the color inks. Evaluation was made in accordance with the following standard:

A: Neither bleeding nor uneven color mixing occurred;

B: Bleeding and uneven color mixing partially occurred, but no problem arose from the viewpoint of practical use;

C: Bleeding and uneven color mixing occurred, and a problem arose from the viewpoint of practical use.

[White haze]

The same pattern as in the evaluation as to bleeding was recorded to observe whether white uneven parts occurred or not in a black image region adjoining to a color image region. Evaluation was made in accordance with the following standard:

A: No white uneven part occurred;

C: White uneven parts occurred.

TABLE 3

|  | Surface tension (dyn/cm) | | | | |
| --- | --- | --- | --- | --- | --- |
|  | Black ink $A_1$ | Black ink $B_1$ | Yellow ink | Magenta ink | Cyan ink |
| Ex. 12 | 49 | 48 | 34 | 34 | 34 |
| Ex. 13 | 50 | 48 | 43 | 43 | 43 |
| Ex. 14 | 45 | 44 | 30 | 30 | 30 |
| Ex. 15 | 45 | 34 | 33 | 33 | 33 |
| Ex. 16 | 45 | 45 | 34 | 34 | 34 |

TABLE 4

|  | Quality of black characters | Bleeding | White haze |
| --- | --- | --- | --- |
| Ex. 12 | A | A | A |
| Ex. 13 | A | A | A |
| Ex. 14 | A | A | A |
| Ex. 15 | A | A | A |
| Ex. 16 | A | A | A |
| Comp. Ex. 5 | B | C | C |

EXAMPLES 17 TO 20 AND COMPARATIVE EXAMPLE 6

Ink sets according to Examples 17 to 20 were respectively prepared by combining two inks of a pigment ink and a dye ink as black inks with each and using yellow, magenta and cyan inks as color inks. Each ink was prepared in the following manner. After its corresponding components described below were stirred into a solution, the solution was filtered under reduced pressure through a microfilter (product of Fuji Photo Film Co., Ltd.) having a pore size of 3 μm when the ink was a black pigment ink, or through a microfilter (product of Fuji Photo Film Co., Ltd.) having a pore size of 0.2 μm when the ink was a black dye ink or a color ink, thereby preparing inks.

Example 17

Black Ink $A_2$:

| Carbon Black 1 (cationic) | 5 parts |
| --- | --- |
| Ethylene glycol | 9 parts |
| Diethylene glycol | 5 parts |
| Water | 81 parts. |

Black Ink $B_2$:

| C.I. Direct Black 195 (anionic) | 2.5 parts |
| --- | --- |
| Triethylene glycol | 7 parts |
| Diethylene glycol | 5 parts |
| Sodium hydroxide | 0.2 parts |
| Isopropyl alcohol | 4 parts |
| Water | 81.3 parts. |

Yellow ink:

| C.I. Direct Yellow 86 | 2 parts |
| --- | --- |
| Glycerol | 5 parts |
| Thiodiglycol | 5 parts |
| Diethylene glycol | 5 parts |
| Acetylenol EH | 0.7 parts |
| Water | 82.3 parts. |

Magenta ink:

| C.I. Acid Red 54 | 3 parts |
| --- | --- |
| Glycerol | 5 parts |
| Thiodiglycol | 5 parts |
| Diethylene glycol | 5 parts |
| Acetylenol EH | 0.7 parts |
| Water | 81.3 parts. |

Cyan ink:

| C.I. Direct Blue 199 | 3 parts |
| --- | --- |
| Glycerol | 5 parts |
| Thiodiglycol | 5 parts |
| Diethylene glycol | 5 parts |
| Acetylenol EH | 0.7 parts |
| Water | 81.3 parts. |

Example 18

| Black Ink A₂: | |
|---|---|
| Carbon Black 2 (cationic) | 5 parts |
| Ethylene glycol | 9 parts |
| Diethylene glycol | 5 parts |
| Water | 81 parts. |

| Black Ink B₂: | |
|---|---|
| C.I. Direct Black 154 (anionic) | 3 parts |
| Triethylene glycol | 7 parts |
| Diethylene glycol | 5 parts |
| Sodium polyacrylate | 0.7 parts |
| Water | 84.3 parts. |

| Yellow ink: | |
|---|---|
| C.I. Direct Yellow 132 | 3 parts |
| Glycerol | 5 parts |
| Thiodiglycol | 5 parts |
| Diethylene glycol | 9 parts |
| Isopropyl alcohol | 7 parts |
| Water | 71 parts. |

| Magenta ink: | |
|---|---|
| C.I. Acid Red 94 | 3 parts |
| Glycerol | 5 parts |
| Thiodiglycol | 5 parts |
| Diethylene glycol | 9 parts |
| Acetylenol EH | 7 parts |
| Water | 71 parts. |

| Cyan ink: | |
|---|---|
| C.I. Acid Blue 9 | 3 parts |
| Glycerol | 5 parts |
| Thiodiglycol | 5 parts |
| Diethylene glycol | 9 parts |
| Isopropyl alcohol | 7 parts |
| Water | 71 parts. |

Example 19

| Black Ink A₂: | |
|---|---|
| Pigment Dispersion 3 (cationic) | 20 parts |
| Polyethylene glycol | 9 parts |
| Diethylene glycol | 5 parts |
| Water | 66 parts. |

| Black Ink B₂: | |
|---|---|
| C.I. Direct Black 195 (anionic) | 2.5 parts |
| Triethylene glycol | 7 parts |
| Diethylene glycol | 5 parts |
| Acetylenol EH | 0.5 parts |
| Water | 85 parts. |

| Yellow ink: | |
|---|---|
| C.I. Direct Yellow 142 | 2 parts |
| Glycerol | 5 parts |
| Thiodiglycol | 5 parts |
| Diethylene glycol | 5 parts |
| Polyoxyethylene lauryl ether | 2 parts |
| Water | 81 parts. |

| Magenta ink: | |
|---|---|
| C.I. Acid Red 35 | 3 parts |
| Glycerol | 5 parts |
| Thiodiglycol | 5 parts |
| Diethylene glycol | 5 parts |
| Polyoxyethylene lauryl ether | 2 parts |
| Water | 80 parts. |

| Cyan ink: | |
|---|---|
| C.I. Direct Blue 86 | 3 parts |
| Glycerol | 5 parts |
| Thiodiglycol | 5 parts |
| Diethylene glycol | 5 parts |
| Polyoxyethylene lauryl ether | 2 parts |
| Water | 80 parts. |

Example 20

| Black Ink A₂: | |
|---|---|
| Kayacel Black CN (cationic) | 4 parts |
| 1,5-Pentanediol | 9 parts |
| Diethylene glycol | 5 parts |
| Polyethyleneimine | 2 parts |
| Water | 80 parts. |

| Black Ink B₂: | |
|---|---|
| Pigment Dispersion 4 (anionic) | 30 parts |
| Triethylene glycol | 7 parts |
| Diethylene glycol | 5 parts |
| Acetylenol EH | 0.7 parts |
| Water | 57.3 parts. |

| Yellow ink: | |
|---|---|
| C.I. Direct Yellow 142 | 2 parts |
| Glycerol | 5 parts |
| Thiodiglycol | 5 parts |
| Diethylene glycol | 5 parts |
| Triethylene glycol monobutyl ether | 5 parts |
| Water | 78 parts. |

| Magenta ink: | |
|---|---|
| C.I. Acid Red 35 | 3 parts |
| Glycerol | 5 parts |
| Thiodiglycol | 5 parts |
| Diethylene glycol | 5 parts |
| Triethylene glycol monobutyl ether | 5 parts |
| Water | 77 parts. |

| Cyan ink: | |
|---|---|
| C.I. Direct Blue 86 | 3 parts |
| Glycerol | 5 parts |
| Thiodiglycol | 5 parts |
| Diethylene glycol | 5 parts |
| Triethylene glycol monobutyl ether | 5 parts |
| Water | 77 parts. |

The surface tensions of the inks in each example are shown in Table 5.

Comparative Example 6

Only Black Ink B₂ of the black inks prepared in Example 17 was used to conduct recording.

The respective inks of the above-described Examples and Comparative Example were used to conduct recording on commercially available paper for copying (Canon PB paper and Xerox 4024 paper) and bond paper (Plover Bond).

As an ink-jet recording apparatus, was used a recording apparatus similar to that shown in FIG. 4. Images were formed using 5 recording heads as illustrated in FIG. 9. Incidentally, the recording heads used herein were the same recording heads as that used in BJC820 (trade name, ink-jet printer manufactured by Canon Inc.). Drive conditions for the recording heads, namely, energizing conditions for a heater in each head were as follows:

Applied voltage: 28 V
Pulse width: 3.2 μsec
Drive frequency: 5 kHz.

In the present invention, two black inks, i.e., Black Ink $A_2$ and Black Ink $B_2$ are used as black inks. Therefore, Black Ink $A_2$ was used in one recording head, and Black Ink $B_2$ in another recording head to conduct the recording. Further, the yellow, magenta and cyan inks were separately used in other three recording heads.

In Comparative Example, one and the same black ink was used in two recording heads for black inks to conduct the recording.

In each example, the record image of a black color was formed by using the two recording heads to make a record of 50% duty by one recording head and make the remaining record of 50% duty by the other recording head so as to give 100% duty. Record dots were formed by such a method as illustrated in FIG. 8. The dot-forming method is an example, and the present invention is not limited to this method.

Incidentally, a black ink having a higher surface tension was charged into a leading recording head in order that the black ink may impact first on a recording medium. Besides, with respect to the relationship between the black inks and the color inks, the recording was conducted in such a manner that the black inks impact first on the recording medium.

The record images obtained in Examples 17 to 20 and Comparative Example 6 were evaluated as to quality of black characters, and bleeding and white haze between black ink and color ink. The results thereof are shown in Table 6.

Incidentally, the evaluation of the record images was conducted in the same manner as in Example 12.

TABLE 5

| | Surface tension (dyn/cm) | | | | |
|---|---|---|---|---|---|
| | Black ink $A_2$ | Black ink $B_2$ | Yellow ink | Magenta ink | Cyan ink |
| Ex. 17 | 49 | 48 | 34 | 34 | 34 |
| Ex. 18 | 50 | 48 | 43 | 43 | 43 |
| Ex. 19 | 45 | 34 | 30 | 30 | 30 |
| Ex. 20 | 47 | 43 | 33 | 33 | 33 |

TABLE 6

| | Quality of black characters | Bleeding | White haze |
|---|---|---|---|
| Ex. 17 | A | A | A |
| Ex. 18 | A | A | A |
| Ex. 19 | A | A | A |
| Ex. 20 | A | A | A |
| Comp. Ex. 6 | B | C | C |

As described above, the ink set according to the present invention, comprising two black inks different in polarity from each other, wherein one of said two black inks is a pigment ink, and the other is also a pigment ink, can attain high optical density and provide images having good fixing ability, irrespective of the kind of plain paper.

In addition, the ink-jet recording method and apparatus according to the present invention, wherein such an ink set is used, can attain high optical density and permits recording of images good in fixing ability, irrespective of the kind of plain paper.

Further, the ink set according to the present invention, comprising two black inks different in polarity from each other, wherein one of said two black inks is a pigment ink, and the other is a dye ink, can attain high optical density and provide images good in fastness properties such as water fastness and light fastness and fixing ability, irrespective of the kind of plain paper.

In addition, the ink-jet recording method and apparatus according to the present invention, wherein such an ink set is used, can attain high optical density and permits recording of images good in fastness properties such as water fastness and light fastness and fixing ability, irrespective of the kind of plain paper.

Further, the ink set according to the present invention, comprising two black inks different in polarity from each other, and color inks can attain high quality of black characters, prevent bleeding between black ink and color ink and white haze occurred in a black image region at a boundary area between black ink and color ink, irrespective of the kind of plain paper, and hence permits the provision of clear color images.

In addition, the ink-jet recording method and apparatus according to the present invention, wherein such an ink set is used, can attain high quality of black characters, prevent bleeding between black ink and color ink and white haze occurred in a black image region at a boundary area between black ink and color ink, irrespective of the kind of plain paper, and hence permits recording of clear color images.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set comprising two black inks different in polarity from each other, wherein one of said two black inks is a pigment ink, and the other is also a pigment ink.

2. An ink set comprising two black inks the coloring materials for which are different in polarity from each other, wherein one of said two black inks is a pigment ink, and the other is also a pigment ink.

3. An ink set comprising two black inks the coloring materials for which are both pigments, wherein one black ink is cationic, and the other black ink is anionic.

4. The ink set according to claim 3, wherein the cationic ink is a pigment ink in which a pigment is dispersed with a cationic polymer or surfactant, or a self-dispersing pigment ink in which a hydrophilic group having a cationic group is bonded to the surface of a pigment through an atomic group.

5. The ink set according to claim 3, wherein the anionic ink is a pigment ink in which a pigment is dispersed with an anionic polymer or surfactant, or a self-dispersing pigment ink in which a hydrophilic group having an anionic group is bonded to the surface of a pigment through an atomic group.

6. The ink set according to claim 3, wherein one black ink of said two black inks the coloring materials for which are both pigments is a self-dispersing cationic pigment ink in which a hydrophilic group having a cationic group is directly bonded to carbon black, and the other black ink is a self-dispersing anionic pigment ink in which a hydrophilic group having a anionic group is directly bonded to carbon black.

7. The ink set according to claim 6, wherein the hydrophilic group in the cationic pigment ink is composed of at least one aromatic or heterocyclic group and at least one cationic group.

8. The ink set according to claim 6, wherein the cationic group is a quaternary ammonium group.

9. The ink set according to claim 7, wherein the cationic group is a quaternary ammonium group.

10. The ink set according to claim 6, wherein the anionic group is a sulfonic or carboxyl group.

11. The ink set according to any one of claims 1–10, wherein one black ink of the two black inks has a surface tension of at least 40 dyn/cm, and the other black ink has a surface tension lower than 40 dyn/cm.

12. The ink set according to any one of claims 1—10, wherein the concentrations of the coloring materials used for the two black inks differ from each other.

13. An ink set comprising two black inks different in polarity from each other, wherein one of said two black inks is a pigment ink, and the other is a dye ink.

14. An ink set comprising two black inks the coloring materials for which are different in polarity from each other, wherein one of said two black inks is a pigment ink, and the other is a dye ink.

15. An ink set comprising two black inks the coloring materials for which are a pigment for one ink and a dye for the other ink, wherein one black ink is cationic, and the other black ink is anionic.

16. The ink set acording to claim 15, wherein the cationic ink is a pigment ink in which a pigment is dispersed with a cationic polymer or surfactant, or a self-dispersing pigment ink in which a hydrophilic group having a cationic group is bonded to the surface of a pigment through an atomic group.

17. The ink set according to claim 15, wherein the cationic ink is a cationic dye ink.

18. The ink set according to claim 15, wherein the anionic ink is a pigment ink in which a pigment is dispersed with an anionic polymer or surfactant, or a self-dispersing pigment ink in which a hydrophilic group having an anionic group is bonded to the surface of a pigment through an atomic group.

19. The ink set according to claim 15, wherein the anionic ink is an anionic dye ink.

20. The ink set according to claim 15, wherein one black ink of said two black inks the coloring materials for which are a pigment for one ink and a dye for the other ink is a self-dispersing cationic pigment ink in which a hydrophilic group having a cationic group is directly bonded to carbon black, and the other black ink is an anionic dye ink.

21. The ink set according to claim 20, wherein the hydrophilic group in the cationic pigment ink is composed of at least one aromatic or heterocyclic group and at least one cationic group.

22. The ink set according to claim 21, wherein the cationic group is a quaternary ammonium group.

23. The ink set according to claim 20, wherein the cationic pigment ink comprises a cationic polymer.

24. The ink set according to claim 20, wherein the anionic dye ink comprises an anionic polymer.

25. The ink set according to claim 15, wherein one black ink of said two black inks the coloring materials for which are a pigment for one ink and a dye for the other ink is a cationic dye ink, and the other black ink is a self-dispersing anionic pigment ink in which a hydrophilic group having an anionic group is directly bonded to carbon black.

26. The ink set according to claim 25, wherein the anionic group is a sulfonic or carboxylic group.

27. The ink set according to claim 25, wherein the anionic pigment ink comprises an anionic polymer.

28. The ink set according to claim 25, wherein the cationic dye ink comprises a cationic polymer.

29. The ink set according to any one of claims 13 to 28, wherein one black ink of the two black inks has a surface tension of at least 40 dyn/cm, and the other black ink has a surface tension lower than 40 dyn/cm.

30. The ink set according to claim 14 or 15, wherein the concentrations of the coloring materials used for the two black inks differ from each other.

31. An ink set comprising two black inks different in polarity from each other as black inks and at least one additional color ink, wherein one of said two black inks is a pigment ink, and the other is also a pigment ink.

32. An ink set comprising two black inks different in polarity from each other as black inks and at least one additional color ink, wherein one of said two black inks the coloring materials for which are different in polarity from each other is a pigment ink, and the other is also a pigment ink.

33. An ink set comprising two black inks different in polarity from each other as black inks and at least one additional color ink, wherein coloring materials used for said two black inks are both pigments, one black ink is cationic, and the other black ink is anionic.

34. The ink set according to claim 33, wherein the cationic ink is a pigment ink in which a pigment is dispersed with a cationic polymer or surfactant, or a self-dispersing pigment ink in which a hydrophilic group having a cationic group is bonded to the surface of a pigment through an atomic group.

35. The ink set according to claim 33, wherein the anionic ink is a pigment ink in which a pigment is dispersed with an anionic polymer or surfactant, or a self-dispersing pigment ink in which a hydrophilic group having an anionic group is bonded to the surface of a pigment through an atomic group.

36. An ink set comprising two black inks different in polarity from each other as black inks and at least one additional color ink, wherein one black ink of said two black inks the coloring materials for which are both pigments is a self-dispersing cationic pigment ink in which a hydrophilic group having a cationic group is directly bonded to carbon black, and the other black ink is a self-dispersing anionic pigment ink in which a hydrophilic group having an anionic group is directly bonded to carbon black.

37. The ink set according to claim 36, wherein the hydrophilic group in the cationic pigment ink is composed of at least one aromatic or heterocyclic group and at least one cationic group.

38. The ink set according to claim 36, wherein the cationic group is a quaternary ammonium group.

39. The ink set according to claim 37, wherein the cationic group is a quaternary ammonium group.

40. The ink set according to claim 36, wherein the anionic group is a sulfonic or carboxylic group.

41. An ink set comprising two black inks different in polarity from each other as black inks and at least one additional color ink, wherein one black ink of the two black inks is a pigment ink and has a surface tension of at least 40 dyn/cm, and the other black ink is also a pigment ink and has a surface tension lower than 40 dyn/cm.

42. An ink set comprising two black inks different in polarity from each other as black inks and at least one additional color ink, wherein one of said two black inks different in polarity from each other is a pigment ink, and the other is a dye ink.

43. An ink set comprising two black inks different in polarity from each other as black inks and at least one additional color ink, wherein one of said two black inks the coloring materials for which are different in polarity from each other, and wherein one of said two black inks is a pigment ink, and the other is a dye ink.

44. An ink set comprising two black inks different in polarity from each other as black inks and at least one additional color ink, wherein coloring materials used for said two black inks are a pigment for one ink and a dye for the other ink, one black ink is cationic, and the other black ink is anionic.

45. The ink set according to claim 44, wherein the cationic ink is a pigment ink in which a pigment is dispersed with a cationic polymer or surfactant, or a self-dispersing pigment ink in which a hydrophilic group having a cationic group is bonded to the surface of a pigment through an atomic group.

46. The ink set according to claim 44, wherein the cationic in is a cationic dye ink.

47. The ink set according to claim 44, wherein the anionic ink is a pigment ink in which a pigment is dispersed with an anionic polymer or surfactant, or a self-dispersing pigment ink in which a hydrophilic group having an anionic group is bonded to the surface of a pigment through an atomic group.

48. The ink set according to claim 44, wherein the anionic ink is an anionic dye ink.

49. The ink set comprising two black inks different in polarity from each other as black inks and at least one additional color ink, wherein coloring materials used for said two black inks are a pigment for one ink and a dye for the other ink, one black ink is a self-dispersing cationic pigment ink in which a hydrophilic group having a cationic group is directly bonded to carbon black, and the other black ink is an anionic dye ink.

50. The ink set according to claim 49, wherein the hydrophilic group in the cationic pigment ink is composed of at least one aromatic or heterocyclic group and at least one cationic group.

51. The ink set according to claim 50, wherein the cationic group is a quaternary ammonium group.

52. The ink set according to claim 49, wherein the cationic pigment ink comprises a cationic polymer.

53. The ink set according to claim 49, wherein the anionic dye ink comprises an anionic polymer.

54. An ink set comprising two black inks different in polarity from each other as black inks and at least one additional color ink, wherein coloring materials used for said two black inks are a pigment for one ink and a dye for the other ink, one black ink is a cationic dye ink, and the other black ink is a self-dispersing anionic pigment ink in which a hydrophilic group having an anionic group is directly bonded to carbon black.

55. The ink set according to claim 54, wherein the anionic group is a sulfonic or carboxylic group.

56. The ink set according to claim 54, wherein the anionic pigment ink comprises an anionic polymer.

57. The ink set according to claim 54, wherein the cationic dye ink comprises a cationic polymer.

58. The ink set according to any one of claims 42 to 57, wherein one black ink of the two black inks has a surface tension of at least 40 dyn/cm, and the other black ink has a surface tension lower than 40 dyn/cm.

59. The ink set according to any one of claims 31, 32, 33, 36, 41, 42, 43, 44, 49 or 54, wherein a coloring material used for the color ink comprises a dye.

60. The ink set according to any one of claims 31, 32, 33, 36, 41, 42, 43, 44, 49 or 54, comprising at least three color inks as the color ink, and the color inks are at least yellow, magenta and cyan inks.

61. The ink set according to any one of claims 31, 32, 33, 36, 41, 42, 43, 44, 49 or 54, wherein the color ink has a surface tension lower than 40 dyn/cm.

62. An ink-jet recording process for recording an image including a black area on a recording medium comprising a step of forming the area by
  (i) ejecting a first black ink having a first polarity towards the recording medium by an ink-jet process; and
  (ii) ejecting a second black ink having a second polarity opposite to the first polarity towards the recording medium by an ink-jet process,
  wherein both the first and the second black inks contain a pigment, and wherein the steps (i) and (ii) are conducted so that the first and the second black inks are brought into contact with each other on the recording medium.

63. An ink-jet recording process for recording an image including a black area on a recording medium, comprising a step of forming the area by
  (i) ejecting a first black ink having a first polarity towards the recording medium by an ink-jet process; and
  (ii) ejecting a second black ink having a second polarity opposite to the first polarity towards the recording medium by an ink-jet process,
  wherein the first black ink contains a pigment and the second black ink contains a dye, and
  wherein the steps (i) and (ii) are conducted so that the first ink and the second ink are brought into contact with each other on the recording medium.

64. An ink-jet recording method comprising ejecting ink droplets from orifices in response to recording signals to conduct recording on a recording medium, wherein two black inks different in polarity from each other are used as black inks to conduct the recording, wherein the ink set according to any one of claims 1 or 3 to 11 is used as the black inks.

65. An ink-jet recording method for producing a color image including a black area and a color area on a recording medium comprising the steps of:
  (i) providing a first black ink having a first polarity and a second black ink having a second polarity opposite to the first polarity;
  (ii) providing a color ink;
  (iii) ejecting the first black ink towards the recording medium by an ink-jet process;
  (iv) ejecting the second black ink towards the recording medium by an ink-jet process; and
  (v) ejecting the color ink towards the recording medium by an ink-jet process,
  wherein both of the first and the second black inks comprise a pigment, and the steps (ii) and (iii) are conducted so that the first and the second black inks are brought into contact with each other on the recording medium.

66. An ink-jet recording method for producing a color image including an area in black and an area in color on a recording medium, comprising the steps of:
  (i) providing a first black ink having a first polarity and a second black ink having a second polarity opposite to the first polarity;
  (ii) providing a color ink;
  (iii) ejecting the first black ink towards the recording medium;
  (iv) ejecting the second black ink towards the recording medium; and
  (v) ejecting the color ink towards the recording medium;
  wherein the first black ink contains a pigment, and the second black ink contains a dye, and
  wherein the steps (iii) and (iv) are conducted so that the first and the second black inks are brought into contact with each other on the recording medium.

67. The recording method according to claim 65 or 66, wherein the color ink contains a dye.

68. The recording method according to claim 63 or 65, wherein the ink droplets are ejected by applying thermal energy to the inks.

69. The ink set according to any one of claims 1, 2 or 3, wherein at least one of the two black inks further contains a water-soluble polymer of the same polarity as that of the ink.

70. The ink set according to any one of claims 13–15, wherein at least one of the two black inks further contains a water-soluble polymer of the same polarity as that of the ink.

71. The recording method according to claim 65 or 66, wherein the color ink contains a plurality of color inks.

72. The recording method according to claim 71, wherein the plurality of color inks include yellow ink, magenta ink and cyan ink.

73. The recording method according to claim 65 or 66, wherein the color ink has a surface tension of lower than 40 dyn/cm.

74. A process for improving quality in a black image, the image being produced on a recording medium by the steps of:
  (i) applying a first black ink having a first polarity on the recording medium with an ink-jet process;
  (ii) apply a second black ink having a second polarity opposite to the first polarity on the recording medium with an ink-jet process,
  the steps (i) and (ii) being conducted so that the first black ink and the second black ink are brought into contact with each other,
  wherein both of the first and second black inks contain pigment.

75. A process for improving quality in a black image, the image being produced on a recording medium by the steps of:
  (i) applying a first black ink having a first polarity on the recording medium with an ink-jet process;
  (ii) applying a second black ink having a second polarity opposite to the first polarity on the recording medium with an ink-jet process,
  the steps (i) and (ii) being conducted so that the first black ink and the second black ink are brought into contact with each other,
  wherein the first black ink contains pigment, and the second black ink contains dye.

76. A process for alleviating bleed between a black image and a color image adjacent to the black image on a recording medium, the black image being formed by a process comprising a step of applying black ink on the recording medium by an ink-jet process, and the color image being formed by a process comprising a step of applying a color ink by an ink-jet process,
  wherein the step for forming the black image comprises the sub-steps of:
    (i) providing a first black ink having a first polarity;
    (ii) providing a second black ink having a second polarity opposite to the first polarity;
    (iii) applying the first black ink; and
    (iv) applying the second black ink,
  wherein the sub-steps (iii) and (iv) are conducted so that the first black ink and the second black inks are brought into contact with each other, and wherein both of the first and second black inks contain pigment.

77. A process for alleviating bleed between a black image and a color image adjacent to the black image on a recording medium, the black image being formed by a process comprising a step of applying black ink on the recording medium by an ink-jet process, and the color image being formed by a process comprising a step of applying a color ink by an ink-jet process,
  wherein the step for forming the black image comprises the sub-steps of:
    (i) providing a first black ink having a first polarity;
    (ii) providing a second black ink having a second polarity opposite to the first polarity;
    (iii) applying the first black ink; and
    (iv) applying the second black ink,
  wherein the sub-steps (iii) and (iv) are conducted so that the first black ink and the second black ink are brought into contact with each other, and wherein the first black ink contains pigment, and the second black ink contains dye.

78. The ink set according to claim 41, wherein one black ink is cationic, and the other black ink is anionic.

79. The ink set according to claim 78, wherein the cationic ink is a pigment ink in which a pigment is dispersed with a cationic polymer or surfactant, or a self-dispersing pigment ink in which a hydrophilic group having a cationic group is bonded to the surface of a pigment through an atomic group.

80. The ink set according to claim 78, wherein the anionic ink is a pigment ink in which a pigment is dispersed with an anionic polymer or surfactant, or a self-dispersing pigment ink in which a hydrophilic group having an anionic group is bonded to the surface of a pigment through an atomic group.

81. The ink set according to claim 41, wherein one black ink of said two black inks the coloring materials for which are both pigments is a self-dispersing cationic pigment ink in which a hydrophilic group having a cationic group is directly bonded to carbon black, and the other black ink is a self-dispersing anionic pigment ink in which a hydrophilic group having an anionic group is directly bonded to carbon black.

82. The ink set according to claim 81, wherein the hydrophilic group in the cationic pigment ink is composed of at least one aromatic or heterocyclic group and at least one cationic group.

83. The ink set according to claim 81, wherein the cationic group is a quaternary ammonium group.

84. The ink set according to claim 82, wherein the cationic group is a quaternary ammonium group.

85. The ink set according to claim 81, wherein the anionic group is a sulfonic or carboxylic group.

86. A recording unit comprising an ink container portion with an ink held therein and a head from which the ink is ejected in the form of ink droplets, wherein the ink is one in the ink set according to any one of claims 1, 2, 3, 13–15, 31, 32, 33, 36, 41–44, 49, 54 or 78–85.

87. The recording unit according to claim 86, wherein the head is a head of the type that thermal energy is applied to an ink to eject droplets of the ink.

88. The recording unit according to claim 86, wherein the ink container portion is formed of polyurethane, cellulose, polyvinyl acetate or polyolefin resin.

89. An ink cartridge comprising an ink container portion with an ink held therein, wherein the ink is one in the ink set according to any one of claims 1, 2, 3, 13–15, 31, 32, 33, 36, 41–44, 49, 54 or 78–85.

90. The ink cartridge according to claim 89, wherein the ink container portion is formed of a polyolefin at its surface with which the ink comes into contact.

91. An ink-jet recording apparatus comprising a recording unit having an ink container portion with an ink held therein and a head from which the ink is ejected in the form of ink droplets, wherein the ink is one in the ink set according to any one of claims 1, 2, 3, 13–15, 31, 32, 33, 36, 41–44, 49, 54 or 78–85.

92. The ink-jet recording apparatus according to claim 91, wherein the head is a head of the type that thermal energy is applied to an ink to eject droplets of the ink.

93. The ink-jet recording apparatus according to claim 91, wherein the ink container portion is formed of polyurethane, cellulose, polyvinyl acetate or polyolefin resin.

94. An ink-jet recording apparatus comprising a recording head from which an ink is ejected in the form of ink droplets, an ink cartridge having an ink container portion with the ink held therein, and an ink feeder for feeding the ink contained in the ink cartridge to the recording head, wherein the ink is one in the ink set according to any one of claims 1, 2, 3, 13–15, 31, 32, 33, 36, 41–44, 49, 54 or 78–85.

95. The ink-jet recording apparatus according to claim 94, wherein the recording head is a head of the type that thermal energy is applied to an ink to eject droplets of the ink.

96. The ink-jet recording apparatus according to claim 94, wherein the ink container portion is formed of a polyolefin at its surface with which the ink comes into contact.

97. The ink set according to any one of claims 31, 32, 33, 36, 41, 42, 43, 44, 49, 54 or 78–85, wherein at least one of the two black inks further contains a water-soluble polymer of the same polarity as that of the ink.

* * * * *

UNITED STATES PATENT AND TRADEMARK OFFICE
CERTIFICATE OF CORRECTION

PATENT NO. : 6,342,095 B1
DATED : January 29, 2002
INVENTOR(S) : Yoshihisa Takizawa et al.

It is certified that error appears in the above-identified patent and that said Letters Patent is hereby corrected as shown below:

Title page,
Item [56], References Cited, FOREIGN PATENT DOCUMENTS, insert the following:
-- JP 64-58583 3/1989 --.
Item [30], Foreign Application Priority Data, insert the following:
-- April 24, 1988 (JP) ……………………….. 10-129666 --.

Column 1,
Line 26, "to" should read -- to simply as -- and "simply" should be deleted.
Line 27, "to" should read -- to as --.

Column 2,
Line 26, "paper plain" should read -- plain paper -- .
Line 32, "extend." should read -- extent. --.
Line 36, "can" should read -- cannot --.

Column 5,
Line 12, "each" should read -- from each --.

Column 6,
Line 40, "each" should read -- from each --.

Column 7,
Line 32, "uses" should read -- used --.

Column 8,
Line 57, "and a" should read -- and --.

Column 10,
Line 29, "higher-alkyl" should read -- higher-alkyl --.

Column 12,
Line 34, "and an" should read -- and a --.

Column 13,
Line 57, "not" should read -- (not --.
Line 58, "illustrated." should read -- illustrated). --.

UNITED STATES PATENT AND TRADEMARK OFFICE
CERTIFICATE OF CORRECTION

PATENT NO.    : 6,342,095 B1
DATED         : January 29, 2002
INVENTOR(S)   : Yoshihisa Takizawa et al.

It is certified that error appears in the above-identified patent and that said Letters Patent is hereby corrected as shown below:

Column 16,
Line 12, "$-_3\bar{Cl}.\bar{I}$" should read -- $_3\bar{Cl}\bullet\bar{I}$ --.

Column 17,
Line 43, "No. 2" should read -- No. 2 (Product of Advantes Co.) --.

Column 18,
Line 25, "dispersed. Pigment" should read -- dispersed. ¶Pigment --.

Column 21,
Line 40, "After" should read -- After being --.
Line 55, "seconds." should read -- seconds; --.

Column 34,
Line 58, "a anionic" should read -- an anionic --.

Column 35,
Line 7, "claims 1—10," should read -- claims 1-10, --.
Line 21, "acording" should read -- according --.

Column 38,
Line 24, "1 or 3 to 11" should read -- 1 to 10 --.

Column 39,
Line 20, "apply" should read -- applying --.
Line 58, "inks" should read -- ink --.

Signed and Sealed this

Eighteenth Day of March, 2003

JAMES E. ROGAN
*Director of the United States Patent and Trademark Office*